United States Patent [19]

Shirota

[11] 4,376,290
[45] Mar. 8, 1983

[54] COLOR VIDEO INFORMATION PROCESSING APPARATUS

[75] Inventor: Norihisa Shirota, Atsugi, Japan

[73] Assignee: Sony Corporation, Tokyo, Japan

[21] Appl. No.: 197,567

[22] Filed: Oct. 16, 1980

[30] Foreign Application Priority Data

Oct. 16, 1979 [JP] Japan .................. 54-133314

[51] Int. Cl.³ .............................................. H04N 5/76
[52] U.S. Cl. .................. 358/314; 360/38.1; 358/336
[58] Field of Search ............... 358/8, 4, 21 R, 324, 358/327, 336, 314, 310; 360/32, 38, 38.1

[56] References Cited

U.S. PATENT DOCUMENTS 3,890,638  6/1975  Bargen ................................ 358/4
3,921,132  11/1975  Baldwin .............................. 358/4
4,122,489  10/1978  Bolger ............................... 358/21

FOREIGN PATENT DOCUMENTS 2008888  6/1979  United Kingdom ............... 358/314

Primary Examiner—Alan Faber
Attorney, Agent, or Firm—Lewis H. Eslinger; Alvin Sinderbrand

[57] ABSTRACT

In apparatus for processing color video information composed of a color video signal having luminance and chrominance components and a respective identifying signal which identifies a phase of the chrominance component, for example, by indicating the frame, field and/or line of which the respective color video signal is a part; the color video signal and respective identifying signal are temporarily stored in a memory and, when the color video signal and the respective identifying signal are simultaneously read out of the memory, a comparison is made between the read-out identifying signal and a corresponding reference or read request signal, and at least the phase of the chrominance component of the read-out color video signal is controlled on the basis of such comparison. In the case where a line of the read-out color video signal is indicated by its respective identifying signal to be of a field which is different from the read request field defined by the then occurring reference or read request signal so that it would be spatially displaced from the corresponding line of the read request field, the value of at least the luminance component in the read-out line is replaced by an interpolated value derived from values of the luminance component in the lines adjacent the read-out line. When a PAL color video signal is being processed, absolute values of color difference signals are derived, for certain sampling points where such color difference signals do not appear, by interpolation of the values for such color difference signals from adjacent sampling points.

22 Claims, 38 Drawing Figures

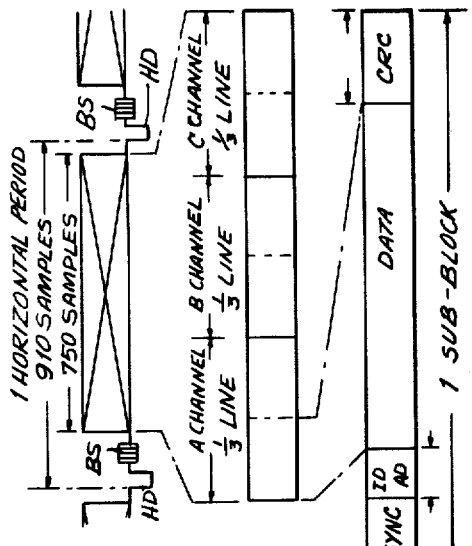
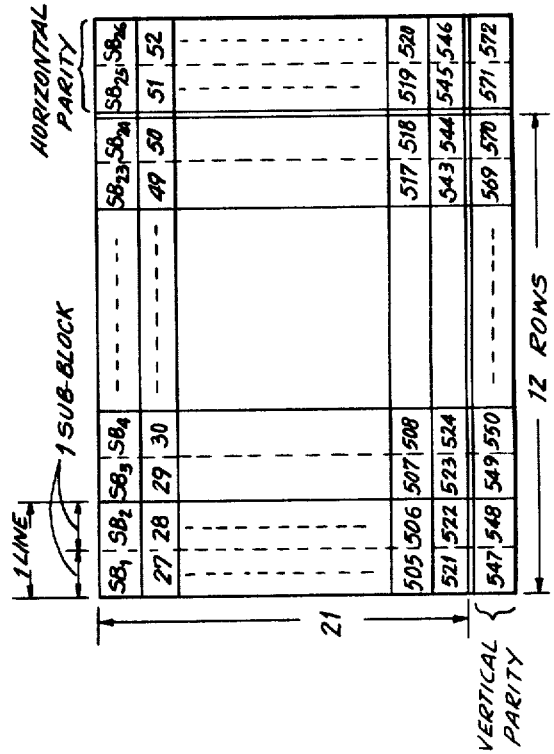
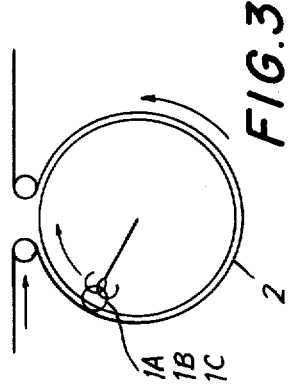
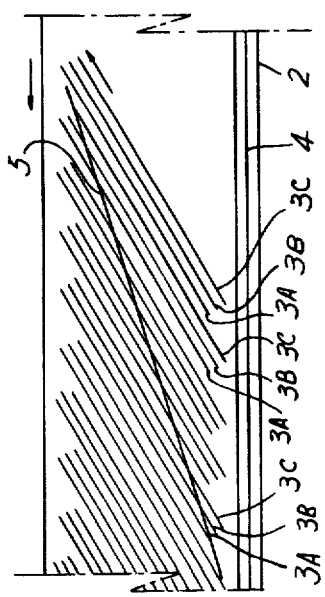
FIG.6A
FIG.6B
FIG.6C
FIG.7
FIG.3
FIG.4
FIG.5

| CONTENT OF THE MEMORY | | | | | SIGNAL WHICH SHOULD BE OBTAINED AS THE OUTPUT (IN THE CASE OF NTSC SYSTEM) | | |
|---|---|---|---|---|---|---|---|
| DATA LINE | CASE 1 | CASE 2 | CASE 3 | CASE 4 | CASE # | YN LUMINANCE SIGNAL COMPONENT | CN COLOR SIGNAL COMPONENT |
| | | | | | | | THE SAME FRAME / DIFFERENT FRAME |
| $L_{n-1}$ | 1 | 2 | 1 | 2 | 1,2 | $Y_{N1,2} = (SL_n)Y$ | $C_{N1,2} = (SL_n)c$ / $C_{N1,2} = -(SL_n)c$ |
| $L_n$ | 1 | 1 | 1 | 1 | 3 | $Y_{N3} = \frac{(SL_{n-1})Y + (SL_n)Y}{2}$ | $C_{N3} = \frac{|(SL_{n-1})c| + |(SL_n)c|}{2}$ |
| $L_{n+1}$ | / | / | 2 | 2 | 4 | $Y_{N4} = \frac{(SL_{n-1})Y + 2(SL_n)Y}{3}$ | $C_{N4} = \frac{2|(SL_n)c| + |(SL_{n-1})c|}{3}$ |
| $RL_n$ | 1 | 1 | 2 | 2 | 5 | $Y_{N5} = \frac{(SL_n)Y + (SL_{n+1})Y}{2}$ | $C_{N5} = \frac{|(SL_n)c| + |(SL_{n+1})c|}{2}$ |
| | | | | | 6 | $Y_{N6} = \frac{2(SL_n)Y + (SL_{n+1})Y}{3}$ | $C_{N6} = \frac{2|(SL_n)c| + |(SL_{n+1})c|}{3}$ |
| | | | | | 7,8 | $Y_{N7,8} = (SL_n)Y$ | $C_{N7,8} = (SL_n)c$ / $C_{N7,8} = -(SL_n)c$ |

THE NUMBER MEANS THE FIELD ( / MEANS "DON'T CARE")

| CONTENT OF THE MEMORY | | | | |
|---|---|---|---|---|
| DATA LINE | CASE 5 | CASE 6 | CASE 7 | CASE 8 |
| $L_{n-1}$ | / | / | / | / |
| $L_n$ | 2 | 2 | 2 | 2 |
| $L_{n+1}$ | 2 | 1 | 2 | 1 |
| $RL_n$ | 1 | 1 | 2 | 2 |

THE NUMBER MEANS THE FIELD ( / MEANS "DON'T CARE")

| | MEANS ABSOLUTE VALUE

FIG. 12

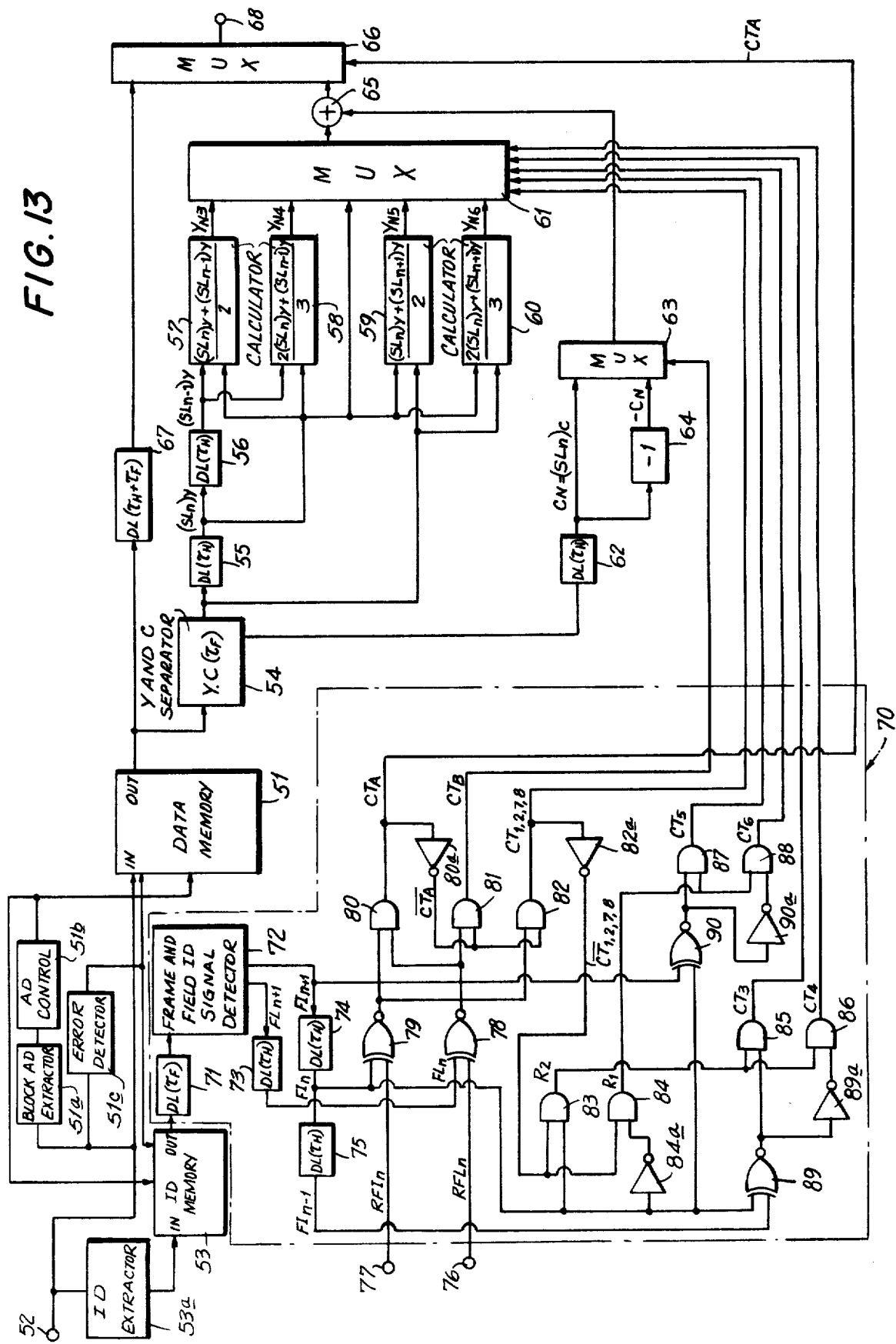

| SIGNAL TO BE OBTAINED AS AN OUTPUT (FOR PAL SYSTEM) | | | | | |
|---|---|---|---|---|---|
| CASE # | LUMINANCE COMPONENT $Y_P$ | COLOR COMPONENT $C_P$ | | | |
| 1,2 | $Y_{P1,2} = (SL_n)_Y$ | $DR_P = (ISL_n)_{DR}, \quad DB_P = (ISL_n)_{DB}$ | LINE ID | SAMPLE DATA ARRANGEMENT ($f_S = 4f_{SCP}$) | |
| 3 | $Y_{P3} = \dfrac{(SL_{n-1})_Y + (SL_n)_Y}{2}$ | $DR_P = \dfrac{(ISL_{n-1})_{DR} + (ISL_n)_{DR}}{2}, \quad DB_P = \dfrac{(ISL_{n-1})_{DB} + (ISL_n)_{DB}}{2}$ | 11 | $+DR_P, +DB_P, -DR_P, -DB_P\ ---$ | |
| 4 | $Y_{P4} = \dfrac{(SL_{n-1})_Y + 2(SL_n)_Y}{3}$ | $DR_P = \dfrac{(ISL_{n-1})_{DR} + 2(ISL_n)_{DR}}{3}, \quad DB_P = \dfrac{(ISL_{n-1})_{DB} + 2(ISL_n)_{DB}}{3}$ | 00 | $-DB_P, -DR_P, +DB_P, +DR_P\ ---$ | |
| 5 | $Y_{P5} = \dfrac{(SL_n)_Y + (SL_{n+1})_Y}{2}$ | $DR_P = \dfrac{(ISL_n)_{DR} + (ISL_{n+1})_{DR}}{2}, \quad DB_P = \dfrac{(ISL_n)_{DB} + (ISL_{n+1})_{DB}}{2}$ | 10 | $-DR_P, -DB_P, +DR_P, +DB_P\ ---$ | |
| 6 | $Y_{P6} = \dfrac{2(SL_n)_Y + (SL_{n+1})_Y}{3}$ | $DR_P = \dfrac{2(ISL_n)_{DR} + (ISL_{n+1})_{DR}}{3}, \quad DB_P = \dfrac{2(ISL_n)_{DB} + (ISL_{n+1})_{DB}}{3}$ | 01 | $+DB_P, +DR_P, -DB_P, -DR_P\ ---$ | |
| 7,8 | $Y_{P7,8} = (SL_n)_Y$ | $DR_P = (ISL_n)_{DR}, \quad DB_P = (ISL_n)_{DB}$ | $ISL_n, ISL_{n-1}, ISL_{n+1}$ ARE THE DATA SAMPLE-INTERPOLATED $DTLID_1, DTLID_2$ | | |

FIG.17B LNRST

FIG.17E $D_2$ (DTLID$_1$=H)

FIG.17I $G_5$ ⟨$\frac{R_1+B_1}{2}$⟩⟨$\frac{R_2+B_2}{2}$⟩⟨$\frac{R_3+B_3}{2}$⟩⟨$\frac{R_4+B_4}{2}$⟩⟨$\frac{R_5+B_5}{2}$⟩⟨$\frac{R_6+B_6}{2}$⟩⟨$\frac{R_7+B_7}{2}$⟩⟨$\frac{B_8+B_8}{2}$⟩

FIG.17O $D_{23}$ (RQLID$_2$=L)

FIG.17P $D_{22}$ (RQLID$_1$=L)

COLOR VIDEO INFORMATION PROCESSING APPARATUS

BACKGROUND OF THE INVENTION

1. Field of the Invention

This invention relates generally to the processing of color video information, and more particularly, is directed to the processing of a digital color video signal, as in a digital video tape recorder (VTR).

2. Description of the Prior Art

In recording and reproducing a digital color video signal by means of a rotary head type VTR, random errors may result from head noise, tape noise or amplifier noise, or a burst error may be caused by a signal drop out. It is a recognized advantage of digital signal processing that erroneous data can be mathematically corrected by the inclusion in the recorded or transmitted data of redundant bits. For example, a well known scheme for correcting digital data involves dividing the latter into blocks and sub-blocks, each of which is recorded or transmitted along with a cyclic redundancy check (CRC) code and horizontal and vertical parity so that, upon reproduction or reception, an error in any such block can be detected from the respective CRC code and then corrected on the basis of the respective parity data. However, the addition to the recorded information data of the redundant bits representing the CRC code and the parity data necessarily increases the recording bit rate which is limited by the necessity of minimizing the consumption of tape. Therefore, the error correcting ability is limited by the acceptable redundancy, and may be exceeded when an error of substantial extent is encountered.

It has further been proposed to conceal an error in a transmitted or recorded video signal so that such error will not be noticed in the displayed picture by replacing the erroneous data with data of the immediately preceding line of the same field. Another existing error-concealing method involves replacement of the erroneous data with a mean value of data from the lines immediately preceding and following the line containing the error. Each of the foregoing error concealing methods obtains the signal which is to be substituted for the erroneous data from the data of the same field. However, since the television picture is formed by interlaced scanning, it will be appreciated that adjacent lines in the same field are spaced apart by a distance that is twice the distance between adjacent lines in the pictorial representation of the complete frame made up of two interlaced fields. Therefore, the data in immediately adjacent lines of such pictorial representation of two contiguous fields of the video signal have an even higher correlation therebetween.

In view of the above, it has been proposed by the assignee of this application to effect error concealment by replacing error-containing data in a line of one field with corresponding data in a line of the next previous field which, in the pictorial representation of the two fields, is positioned immediately adjacent the error-containing line so that the data used for concealing an error will bear a close resemblance to the original or correct data which it replaces. However, in the case of a color video signal, the phase of the chrominance component, that is, of the subcarriers of the color information, may not be the same at corresponding locations in immediately adjacent lines of the pictorial representation of two contiguous fields. In other words, even if the color information is the same at corresponding locations in the immediately adjacent lines, the polarities thereof may be relatively inverted.

For example, in the case of an NTSC color video signal, if error containing data in a line of one field is replaced with corresponding data in the same line of the next previous field, the line from which data is obtained for replacing the erroneous data may be disposed either above or below the error-containing line in a pictorial representation of the interlaced fields, depending upon whether such fields are from the same frame or from different frames. More particularly, if the error-containing data occurs in a line of the second field of a frame and is replaced with corresponding data in the same line of the next previous field, that is, the first field of the same frame, such line of the first field is positioned immediately below the error-containing line in the pictorial representation of the complete frame, and the color information of the data used to replace the error-containing data is the same as, and of the same polarity as the color information in the error-containing line. On the other hand, if the error-containing data occurs in a line of the first field of a frame so that the next previous field is the second field of the earlier frame, then the line of such next previous field from which the data is derived for replacing the error-containing data is positioned immediately above the error-containing line in the pictorial representation of the two fields and the color information in such line immediately above the error-containing line will be of inverted polarity in respect to the color information in the error-containing line.

Accordingly, in the case of an NTSC color video signal, if error-containing data in a line of one field is replaced by corresponding data from the same line in the next previous field, the color information of the data used for replacing the error-containing data may or may not have the same polarity as the latter. Furthermore, since the error-containing line of one field and the same line in the next previous field from which data is derived for replacing the error-containing data are spatially displaced from each other in the vertical direction on the pictorial representation of the two interlaced fields, a discontinuity occurs, particularly in respect to the luminance component, at the location of the replaced data. Consequently, if the data used for concealing or replacing the error-containing data in an NTSC color video signal are not further processed, both the luminance and chrominance components are adversely affected and an unnatural or distorted color picture results.

Similarly, in the case of a PAL color video signal, if error-containing data in a line of one field is replaced with corresponding data in the same line of the next previous field, which in a pictorial representation of the two fields, is positioned immediately adjacent the error-containing line, the color information of the line of such next previous field from which data is to be derived for replacing the error-containing data will either be of inverted polarity in respect to the corresponding color information in the error-containing line, or different color information will appear at the corresponding sampling points along the two next adjacent lines. The spatial displacement of the error-containing line and the same line of the next previous field from which data is drawn for replacing or concealing the error-containing data also results in discontinuities, particularly as to the luminance component, at the locations where errors have been concealed in a PAL color video signal. Accordingly, an error occurring in a line of one field of a PAL color video signal cannot be effectively concealed merely by replacing the error-containing data with corresponding data from the same line in the next previous field.

Furthermore, in a VTR, a rotary head repeatedly scans across a magnetic tape while the latter is longitudinally driven for recording a color video signal in successive parallel tracks extending obliquely across the tape. The rate at which the rotary head repeatedly scans the tape is controlled so that, for example, one field of video information is recorded in each track. In the normal reproducing mode, the tape speed is the same as that for recording and the rotary head is made to faithfully scan a single track during each field period so as to reproduce only the field of video information recorded therein. However, in a non-normal reproducing mode, for example, during high-speed reproducing, the speed at which the magnetic tape is driven is many times the normal tape speed so that, during a single field period, the tape scans across a number of tracks and, therefore, reproduces successive fragments of video information from respective different fields and/or frames of the recorded color video signal. If such reproduced video information is employed, as is, for producing a color television picture, the resulting changes in the polarity and type of color information provided at various times during a field period and the discontinuities, particularly in the luminance information caused by the spatial displacement of the lines of the successively scanned lines and/or fields, results in a distorted and unnatural picture.

OBJECTS AND SUMMARY OF THE INVENTION

Accordingly, it is an object of this invention to provide a method and apparatus for processing color video information so as to avoid the above-mentioned problems encountered in the prior art while providing an excellent color picture.

More particularly, it is an object of this invention to provide a method and apparatus for processing color video information apparatus in a digital video tape recorder (VTR), and which ensures that both the luminance and chrominance components of the processed color video signal are suitable for providing a color picture of high quality even when error concealment is effected in the normal reproducing mode or when a non-normal reproducing mode, such as, high-speed reproducing, is selected.

Further, it is an object of this invention to provide a color video information processing method and apparatus, as aforesaid, in which the color video information is digitized and divided into successive sub-blocks of digital data having associated identifying signals and predetermined addresses assigned thereto, and in which address control of memories for temporarily storing the sub-blocks of data and associated identifying signals is based on the addresses assigned to the respective sub-blocks both in the normal reproducing mode and in a non-normal or high-speed reproducing mode, so that the address control for the various modes is unified and can be effected with a relatively simplified arrangement.

In accordance with an aspect of this invention, in processing color video information composed of a color video signal having luminance and chrominance components and a respective identifying signal which identifies a phase of the chrominance component, for example, by indicating the frame, field and/or line of which the respective color video signal is a part; the color video signal and respective identifying signal are temporarily stored, for example, in respective memories, and, when the color video signal and the respective identifying signal are simultaneously read out of the respective memories, comparison is made between the read-out identifying signal and a corresponding reference or read request signal, and at least the phase of the chrominance component of the read-out video signal is controlled on the basis of such comparison.

In the case where a line of the color video signal being read out of the memory is indicated, by its respective identifying signal, to be of a field which is different from the field defined by the then occurring reference or read request signal so that the line of the read-out color video signal would be spatially displaced from the corresponding line of the field defined by the read request signal the value of at least the luminance component in the read-out line is replaced by an interpolated value derived from values of the luminance component in lines adjacent the read-out line.

When a PAL color video signal is being processed according to this invention, absolute values of a color difference signal are derived for certain sampling points along each line where such color difference signal does not appear, by interpolation from the absolute values of such color difference signal at adjacent sampling points on the same line, and then the absolute values of the color difference signals including the interpolated values, are provided with the polarities required by the reference or read request signal.

The above, and other objects, features and advantages of this invention, will be apparent from the following detailed description of illustrative embodiments which is to be read in conjunction with the accompanying drawings.

BRIEF DESCRIPTION OF THE DRAWINGS

FIG. 3 is a schematic illustration of a rotary head assembly included in the digital VTR of FIGS. 1 and 2;

FIG. 4 is a schematic view of rotary heads included in the assembly of FIG. 3;

FIG. 5 is a schematic plan view of a section of magnetic tape showing tracks in which signals are recorded;

FIGS. 6A, 6B, 6C and 7 are schematic diagrams to which reference will be made in explaining the digitization and code arrangement of a video signal for use in the digital VTR embodying this invention.

FIG. 12 is a diagram to which reference will be made in explaining the video signal processing that is effected in accordance with this invention in the case of an NTSC color video signal;

FIG. 13 is a block diagram showing a video signal processing apparatus according to an embodiment of this invention for effecting the processing explained with reference to FIG. 12;

FIG. 14 is a diagram to which reference will be made in explaining the video signal processing that is effected in accordance with this invention in the case of a PAL color video signal;

FIGS. 17A–17S are timing charts to which reference will be made in explaining the operation of the circuits shown on FIG. 16.

DESCRIPTION OF THE PREFERRED EMBODIMENTS

Figure 1:
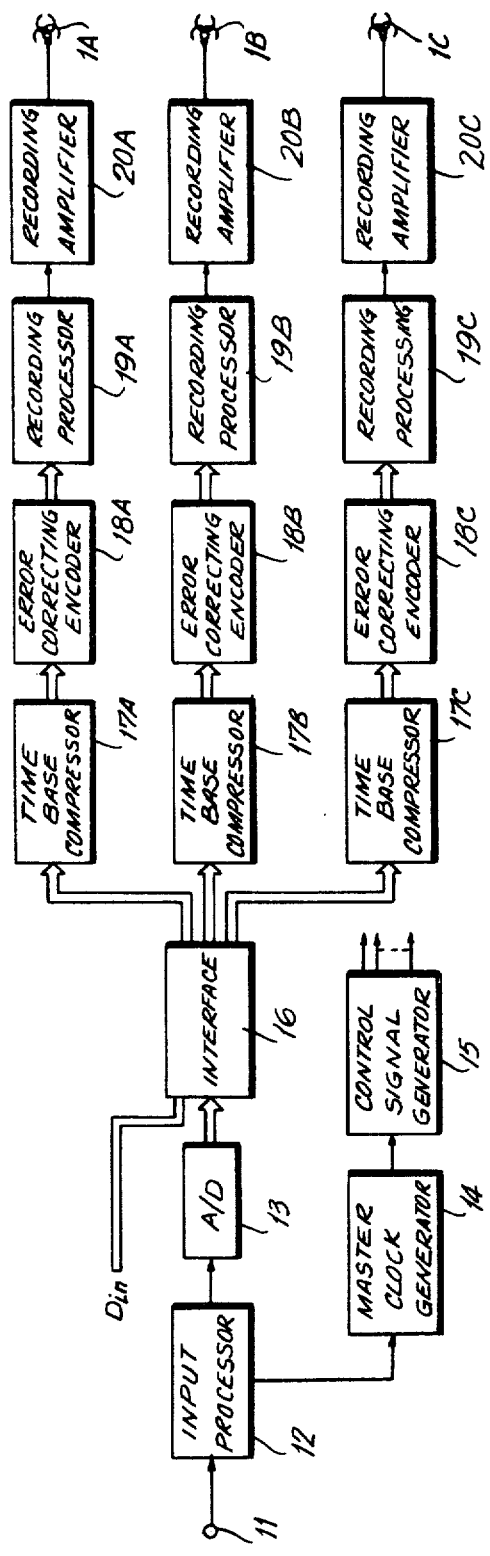
FIGS. 1 and 2 are block diagrams illustrating recording and reproducing sections, respectively, of a digital video tape recorder (VTR) in which a video signal processing apparatus embodying this invention may be advantageously employed.
Figure 2:
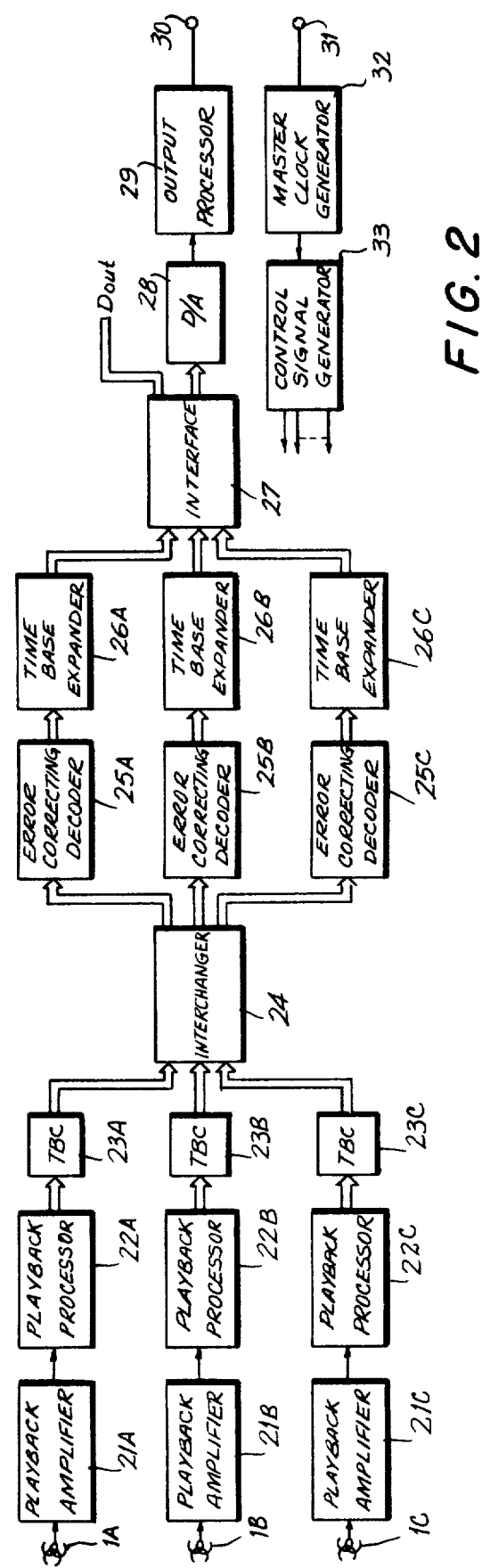

The present invention will hereinafter be described as being applied to a digital VTR made up of a recording section (FIG. 1) and a playback or reproducing section (FIG. 2). In the digital VTR, a digital video signal is recorded by a rotary head assembly (FIG. 3) in parallel tracks extending obliquely on a magnetic tape 2 (FIG. 5). Since the transmitting bit rate of the digital video signal is high, three rotary heads 1A, 1B and 1C (FIG. 4) are disposed in close proximity to each other, and the digital video signals of one field are distributed through three channels to such heads and recorded on the magnetic tape in three parallel tracks 3A, 3B and 3C (FIG. 5). An audio signal may also be converted to a PCM (pulse code modulated) signal and recorded by a rotary head (not shown) in another track (not shown) extending parallel to the video tracks 3A, 3B and 3C. Alternatively, the audio signal may be recorded in a track 4 (FIG. 5) extending along a longitudinal edge of the tape.

Referring in detail to FIG. 1 it will be seen that a color video signal to be recorded is applied through an input terminal 11 to an input processor 12. The input processor 12 may comprise a clamp circuit and a synchronizing and burst signal separator and supplies the effective or video information portion of the color video signal to an A/D converter circuit 13. A synchronizing signal and a burst signal separated from the color video signal by processor 12 are applied to a master clock generator 14 which is desirably of PLL (phase locked loop) construction. The master clock generator 14 generates clock pulses of a suitable sampling frequency fs. The clock pulses from generator 14 and the synchronizing signal are applied to a control signal generator 15 which produces various kinds of timing pulses, identification signals (ID) for identifying lines, fields, frames and tracks, and a control signal, such as, a train of sampling pulses.

The A/D converter circuit 13 generally comprises a sample hold circuit and an A/D converter for converting each sampled output to an 8-bit code which is supplied, in parallel form, to an interface 16. The digitized effective video region of the color video signal is divided by the interface 16 into three channels. The data corresponding to the successive samples of each line are assigned cyclically to the three channels in a repeating order, and the data of the three channels are processed in the same manner. An external digital video signal Din, for example, from an editing apparatus, may also be supplied to interface 16 to be suitably divided into the three channels. The data in one of the channels is derived as a record signal for head 1A after being applied, in sequence, to a time base compression circuit 17A, an error correcting encoder 18A, a recording processor 19A and a recording amplifier 20A. The data in each of the other channels is also processed by the same arrangement, that is, by a time base compression circuit 17B, 17C, an error control encoder 18B, 18C, a recording processor 19B, 19C, and a recording amplifier 20B, 20C, to provide record signals for heads 1B and 1C.

In the case of the NTSC color video signal, the duration or period of one line (1H) is 63.5 μs and a blanking period therein is 11.1 μs. Accordingly, the effective video region or portion is 52.4 μs. If the sampling frequency employed in A/D converter circuit 13 is 4 $f_{SCN}$, in which $f_{SCN}$ is the color subcarrier frequency = 455/2 $f_{HN}$ ($f_{HN}$ being the horizontal or line frequency), then the number of samples in each horizontal period H is 910, as indicated on FIG. 6A. Further, the number of samples in the effective video region of each line is 750, that is, 52.4/63.5 × 910 = 750, so that 250 samples can be conveniently assigned to each of the channels for each line.

The number of lines forming one field is 262.5, with a vertical synchronizing period and an equalizing pulse period accounting for 10.5H. Since test signals VIT and VIR are inserted in the vertical blanking period, they are also regarded as effective video signals, the number of effective video lines in one field period is selected to be 252.

The code arrangement of each of the record signals respectively provided to the heads 1A, 1B and 1C will now be described with reference to FIGS. 6B and 6C. As there shown, the data of one line or horizontal period of the color video signal which comprises 250 samples per channel, as previously mentioned, are divided into two, that is, there are two sub-blocks for each line with 125 samples of data for each sub-block. Each sub-block of the coded digital signal may be composed of 134 samples (1072 bits) in which a block synchronizing signal (SYNC) of three samples (24 bits), an identifying (ID) and address (AD) signal of two samples (16 bits), the information data of 125 samples (1000 bits) and CRC (Cyclic Redundancy Check) code of four samples (32 bits) are arranged one after another. The block synchronizing signal is used for identifying the beginning of a sub-block, whereupon the identifying and address signals, the information data and/or CRC code can be extracted. The identifying signals ID indicate the channel (track), the frame, the field and the line to which the information data of the sub-block belongs, and the address signal AD represents the address of the respective sub-block. The CRC code is used for the detection of an error in the information data of the respective sub-block.

FIG. 7 shows the code arrangement for one field in one channel. In FIG. 7, each reference character SBi (i ~ 1 572) indicates one sub-block, with two sub-blocks making up one block or line. Since the effective video region of one field is comprised of 252 lines, as mentioned previously, the data of 252 blocks (504 sub-blocks) exist in one field. The video information data of a particular field are sequentially arranged in a 21×12 matrix form. Parity data are also provided in connection with the horizontal and vertical directions, respectively, of the video information data in the matrix. More particularly, on FIG. 7, the parity data for the horizontal direction is shown positioned in the thirteenth column of blocks, and the parity data for the vertical direction is positioned in the twenty-second row at the bottom. In the thirteenth column of blocks at the twenty-second row is disposed the horizontal parity data for the vertical parity data. The parity data for the horizontal direction is formed in two ways by 12 sub-blocks respectively taken out of the 12 blocks forming one row of the matrix. In the first row, for example, parity data $SB_{25}$ is formed by the modulo 2 addition:

$$[SB_1] \oplus [SB_3] \oplus [SB_5] \oplus \ldots \oplus [SB_{23}] = [SB_{25}]$$

In the above, [SBi] means only the data in the respective sub-block SBi. In this case, samples belonging to respective ones of the 12 sub-blocks are each calculated in a parallel, 8-bit form. Similarly, by the modulo 2 addition:

$$[SB_2] \oplus [SB_4] \oplus [SB_6] \oplus \ldots \oplus [SB_{24}] = [SB_{26}]$$

parity data $[SB_{26}]$ is formed. The parity data is similarly formed for each of the second to twenty-second rows in the horizontal direction. Enhancement of the error correcting ability results from the fact that parity data is not formed merely by the data of the 24 sub-blocks included in a row, but is formed by the data of 12 sub-blocks positioned at intervals in the row.

The parity data for the vertical direction is formed by the data of 21 sub-blocks in each of the first to twelve columns of blocks. In the first column, parity data $[SB_{547}]$ is formed by the modulo 2 addition:

$$[SB_1] \oplus [SB_{27}] \oplus [SB_{53}] \oplus \ldots [SB_{521}] = [SB_{547}]$$

In this case, samples belonging to each one of the 21 sub-blocks are each calculated in a parallel 8-bit form.

Accordingly, these parity data comprise 125 samples as is also the case with the video data of each sub-block. In the case of transmitting the digital signal of one field of the above matrix arrangement (22×13) as a series of first, second, third, ... twenty-second rows in sequence, since 13 blocks correspond to the length of 12H, a period of 12×22=264H is needed for transmitting the digital signal of one field.

Incidentally, if the VTR is of the C-format type, and thus employs an auxiliary head for recording and reproducing one part of the vertical blanking period in one field, then a duration of only about 250H can be recorded with a video head. Therefore, the period of 264H of data to be transmitted is time-base-compressed (with a compression ratio of Rt of 41/44) to a period or duration of 246H by means of the time base compressor 17A, 17B or 17C so as to leave a margin of several Hs to be recorded in each track. In addition to compressing the video data with the above-noted compression ratio 41/44, each of the time base compressors 17A, 17B and 17C provides a data blanking period in which the block synchronizing signal, the identifying and address signals and the CRC code are inserted for each sub-block of video data of 125 samples, and at the same time, sets up data blanking periods in which the blocks of the parity data are inserted. The parity data for the horizontal and vertical directions and the CRC code of each sub-block are generated by the respective error correcting encoder 18A, 18B or 18C. The block synchronizing signal and the identifying and address signals are added to the video data in the respective recording processor 19A, 19B or 19C. The address signal AD represents the previously noted number (i) of the sub-block. Further, in the recording processor 19A, 19B or 19C there may be provided an encoder of the block coding type which converts the number of bits of one sample from 8 to 10, and a parallel-to-serial converter for serializing the parallel 10-bit code. As disclosed in detail in U.S. patent application Ser. No. 171,481 dated July 23, 1980 and having a common assignee herewith, the block coding is preferably such that $2^8$ codes whose DC levels are close to zero are selected from $2^{10}$ codes of 10-bit and arranged to have one-to-one correspondence to the original 8-bit codes. By means of the foregoing, the DC level of the record signal is made as close to zero as possible, that is, "0" and "1" alternate with each other as much as possible. Such block coding is employed for preventing degradation of the transmitting waveform on the playback side by substantial DC free transmission. It is also possible to achieve the same results by employing a scramble system utilizing the so-called M-sequence which is substantially random in place of the block coding.

In the reproducing or play-back section of the digital VTR to which this invention is advantageously applied, three channels of reproduced signals are derived from the heads 1A, 1B and 1C which scan tracks 3A, 3B and 3C, respectively, corresponding thereto. As shown on FIG. 2, the reproduced signals are applied from heads 1A, 1B and 1C through play-back amplifiers 21A, 21B and 21C to respective play-back processors 22A, 22B and 22C. In each of the playback processors 22A, 22B and 22C, the serial data is converted to parallel form, the block synchronizing signal is extracted, the data is separated from the block synchronizing signal and from the ID, AD and CRC codes or signals, and further, block decoding or 10-bit to 8-bit conversion is performed. The resulting data is applied to a respective time base corrector 23A, 23B or 23C in which any time base error is removed from the data. Each of the time base correctors is provided with, for example, four memories, in which reproduced data are sequentially written by clock pulses synchronized with the reproduced data, and the data are sequentially read out from the memories, by reference clock pulses. When the reading operation is likely to get ahead of the writing operation, the memory from which the data has just been read is read again.

The data of each channel is provided from the respective one of the time base correctors 23A, 23B and 23C to one or the other of error correcting decoders 25A, 25B and 25C by way of a common interchanger 24. In an ordinary playback operation in which the rotary heads faithfully scan the recording tracks on the magnetic tape so that heads 1A, 1B and 1C reproduce only signals recorded in tracks 3A, 3B and 3C, respectively, interchanger 24 passes such signals from time base correctors 23A, 23B and 23C to error correcting decoders 25A, 25B and 25C, respectively. However, during reproducing in other than the normal mode, for example, during high speed reproducting, in which the running speed of the magnetic tape is as high as several tens of times its ordinary speed, each of the rotary heads moves along the line 5 on FIG. 5, and thus scans a plurality of recording tracks. As a result, signals reproduced from the tracks 3A, 3B and 3C are mixed together in the signals supplied from each of the time base correctors 23A, 23B and 23C. In such a case, the interchanger 24 identifies the correct channels of the reproduced signals, using track identifying signals, and supplies the reproduced signals to the error correcting decoder 25A, 25B or 25C for the respective channel.

In each of the error correcting decoders, as hereinafter described in detail, an error occurring in the information data, and particularly one that cannot be corrected by means of the horizontal and vertical parities, may be concealed or interpolated. The data from each error correcting decoder 25A, 25B or 25C is applied to a respective time base expander circuit 26A, 26B or 26C, respectively, which returns the data to the original transmitting rate and then applies the data to a common interface 27. The interface 27 serves to return the reproduced data of the three channels into a single channel which includes a D/A converter circuit 28 for conversion of the data into analog form. From the interface 27 there may also be provided a digital video output Dout. Since a digital video input Din and a digital video output Dout are provided in the recording and reproducing sections of FIGS. 1 and 2, editing and dubbing can be carried out with digital signals, that is, without conversion from and/or to analog form.

The output from the D/A converter circuit 28 is applied to an output processor 29, from which a reproduced color video signal is provided at an output terminal 30. An external reference signal is supplied from a terminal 31 to a master clock generator 32, from which clock pulses and a reference synchronizing signal are provided to a control signal generator 33. The control signal generator 33 provides control signals synchronized with the external reference signal, such as, various timing pulses, reference or requested identifying signals for the line, field and frame, and sample clock pulses.

Figure 10:
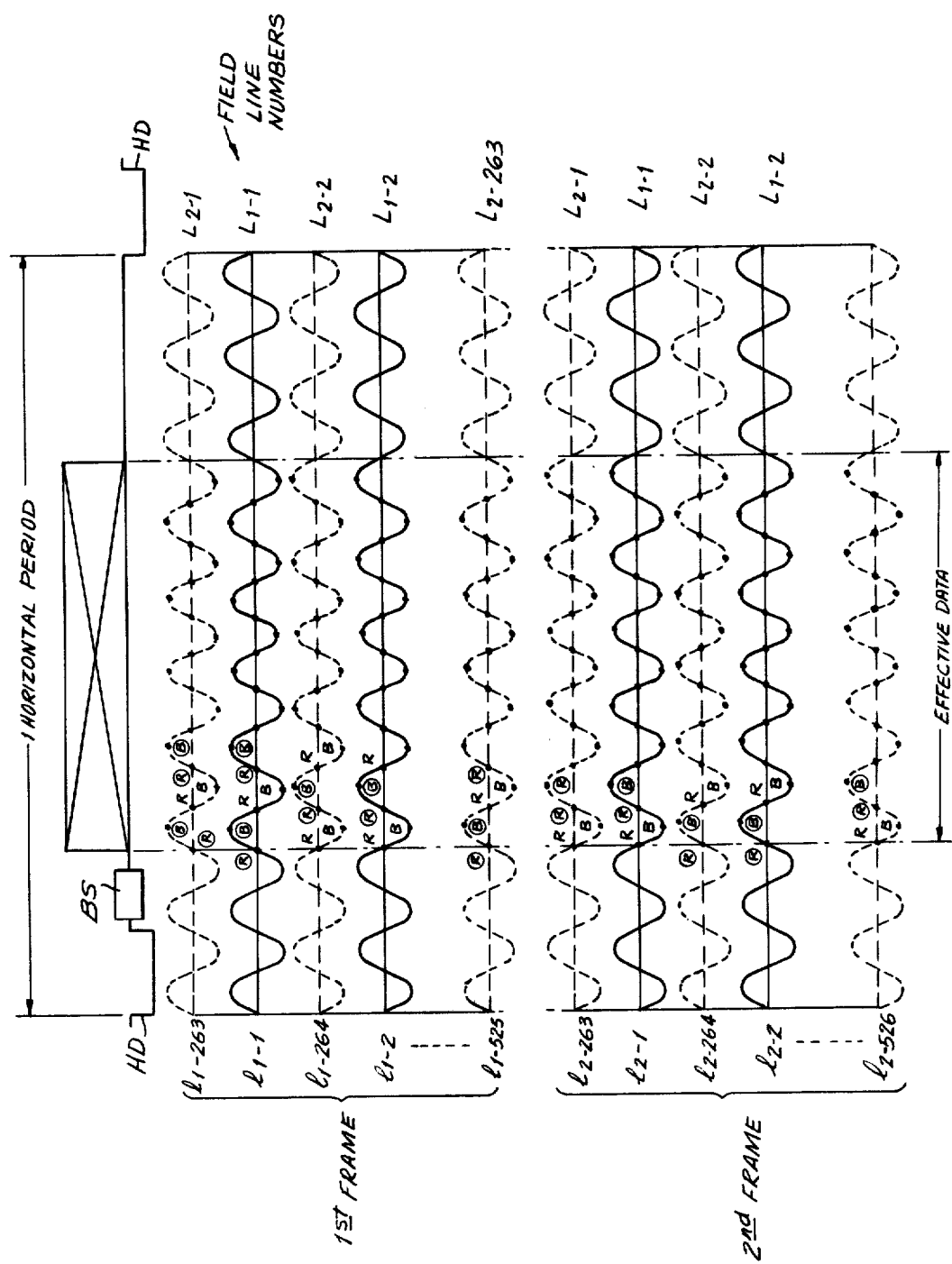
FIG. 10 is a graph to which reference will be made in explaining the phase relation of color subcarriers of an NTSC color video signal.

Before proceeding with a more detailed description of the error correcting decoders 25A, 25B and 25C embodying the present invention, it is believed that understanding of the invention will be facilitated by the following description of the relationships between the information in immediately adjacent lines of a pictorial representation of a complete frame of an NTSC color video signal, as shown on FIG. 10. As earlier noted, in the NTSC system, the color subcarrier frequency $f = 455/2\, f_{HN} = (227 + \frac{1}{2})\, f_{HN}$. Therefore, the phase of the color subcarrier is inverted between one line in one field and the next line in the same field, and also between one line in one frame and the same line in the next frame.

If sampling of the color video signal is effected with a sampling frequency of $4f_{SCN}$, as earlier assumed, and if the sampling is effected at 0°, 90°, 180° and 270° in respect to the ($E_B - E_Y$) or blue color difference signal axis starting from 0° relative to such axis for the first line in the first field of the first frame, then, the color information for two frames will be shown as in FIG. 10.

In the case of the designation of the lines at the left-hand side of FIG. 10, the numbers given to the lines in the first and second fields of each frame are such that the first or odd-numbered field is constituted by the 1st to the 262nd lines, for example, as at $l_{1-1}$ to $l_{1-262}$ in the first field of the first frame, and the second or even-numbered field is constituted by the 263rd to 525th lines, for example, as at $l_{1-263}$ to $l_{1-525}$ in the second field of the first frame. However, if the lines are numbered in order for each field, as at the right-hand side of FIG. 10, then each first or odd-numbered field will contain field line numbers 1 to 262, as indicated at $L_{1-1}$ to $L_{1-262}$ on FIG. 10, and each second or even-numbered field will contain field line numbers 1 to 263, as indicated at $L_{2-1}$ to $L_{2-263}$, at the right-hand side of FIG. 10. Considering such field line numbers, it will be seen that a line in the second or even-numbered field will be disposed immediately above the line of the first or odd-numbered field identified by the same field line number in the pictorial representation of the complete frame.

However, as earlier noted, in a digital VTR only effective video lines are selected for recording so that, for example, the first and second fields of each frame may each be constituted by 1st to 252nd field lines. In such case also, it will be apparent that a line in the second or even-numbered field, when viewed in the pictorial representation of a complete frame, appears immediately above the line in the first or odd-numbered field which is identified by the same field line number.

In FIG. 10, lines in the first field of each frame are indicated by solid lines, and lines in the second field of each frame are indicated by broken lines, with the phase of the subcarrier being shown superimposed thereon. Merely for the sake of clarity and ease of illustration, the subcarrier has been shown on FIG. 10 with a very substantially reduced frequency, and more particularly, as if $f_{SCN} = (9 + \frac{1}{2}) f_{HN}$ rather than $(227 + \frac{1}{2})$ as is actually the case for the NTSC system. For the same reason, FIG. 10 shows the effective data of each line extending over only five cycles of the color subcarrier, with the sampling being effected only within that region, as represented by the black dots, and it will be understood that, in actual practice, the number of samples in the effective video region of each line is 750 for a sampling frequency of $4 \times f_{SCN}$ in the case of an NTSC signal, as previously noted.

The level of an NTSC color video signal $S_k$ is determined by the below equation:

$$S_k = E_Y + \frac{1}{1.14}(E_R - E_Y)\cos\omega_c t \qquad (1)$$
$$+ \frac{1}{2.03}(E_B - E_Y)\sin\omega_c t$$

or $$S_k = E_Y + DR_N \cos\omega_c t + DB_N \sin\omega_c t \qquad (2)$$

$$\omega_c = 2\pi f_c$$

$$DR_N \text{ is } \frac{1}{1.14}(E_R - E_Y)$$

$$DB_N \text{ is } \frac{1}{2.03}(E_B - E_Y)$$

If the signal levels at the sampling points which are 0°, 90°, 180° and 270° in respect to the ($E_B - E_Y$) axis are respectively represented by $S_1$, $S_2$, $S_3$ and $S_4$, the following are obtained from equation (2):

$$S_1 = Y_1 + DR_{N1}(\omega_c t = 0°)$$

$$S_2 = Y_2 + DR_{N2}(\omega_c t = 90°)$$

$$S_3 = Y_3 - DR_{N3}(\omega_c t = 180°)$$

$S_4 = Y_4 - DB_{N4}(\omega ct = 270°)$

Since the first line in the first field of the first frame starts at 0° with respect to the $(E_B - E_Y)$ axis as described previously, the color signals at the sampling points become a positive polarity red color difference signal $+(E_R - E_Y) = DR_N$ at 0°, a positive polarity blue color difference signal $+(E_B - E_Y) = +DB_N$ at 90°, a negative polarity red color difference signal $-(E_R - E_Y) = -DR_N$ at 180°, and a negative polarity blue color difference signal $-(E_B - E_Y) = -DB_N$ at 270°. On FIG. 10, the symbols Ⓡ, R, Ⓑ and B are used to indicate the signals $+DR_N$, $-DR_N$, $+DB_N$ and $-DB_N$, respectively.

As will be noticed from FIG. 10, since the sampling frequency $f_S$ is $4F_{SCN}$ and exactly an integral multiple of the horizontal frequency $f_{HN}$, the sampling phases or positions of the sampling points coincide with each other on all of the lines and the numbers of sampling points are the same on all of the lines.

Further, the color information at a sampling point of a particular line and the color information at the corresponding sampling point of a line in the next previous field, which is positioned immediately below the first mentioned line in the pictorial representation of the complete frame, are the same as each other and have the same phases or polarities. Thus, for example, the color information at any sampling point in the line $l_{1-263}$, that is, the first line $L_{2-1}$ in the second field of the first frame is shown on FIG. 10 to be the same and of the same phase or polarity as the color information at the corresponding sampling point in the line $l_{1-1}$, that is, the first line in the first field of the first frame as the line $l_{1-1}$ appears immediately below the line $l_{1-263}$ in the pictorial representation of the complete frame composed of first and second interlaced fields. Similarly, with respect to the line $l_{2-1}$, that is, the first line $L_{1-1}$ in the first field of the second frame, it will be understood that the line $l_{1-264}$, that is, the second line $L_{2-2}$ in the second field of the first frame would be positioned immediately below the line $l_{2-1}$ in the pictorial representation of the complete frame composed of the second field of the first frame and the first field of the second frame. Thus, at corresponding sampling points in the lines $l_{2-1}$ and $l_{1-264}$, the color information will be the same and of the same phase or polarity.

Therefore, if an uncorrectable error or dropout occurs in an NTSC color video signal, such error can be substantially concealed, at least in respect to the color information, by replacing error-containing data in a line of one field with corresponding data in the line of the next previous field which, in the pictorial representation of a complete frame, is positioned immediately below the error-containing line so that the data used for concealing an error will contain color information which is the same, and of the same polarity as the color information in the original or correct data which it replaces.

Figures 8A, 8B, 9:
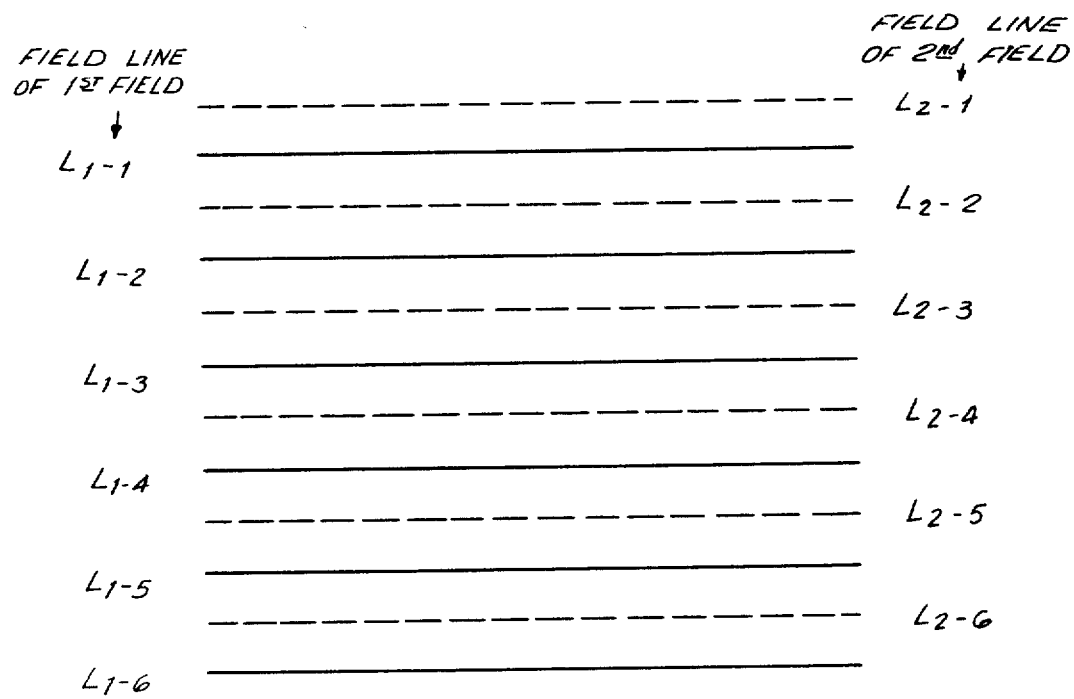
FIGS. 8A and 8B are diagrams to which reference will be made in explaining address control of a memory in respect to the lines of a video signal to be written therein.
FIG. 9 is a diagram illustrating the relation of the lines indicated on FIGS. 8A and 8B in a pictorial representation of a complete frame.

In order to effect concealment of uncorrected errors, each of the error correcting decoders 25A, 25B and 25C includes a memory in which, as hereinafter described in detail, sub-blocks $SB_1$, $SB_2$, $SB_3$-etc. are successively written for the respective channel of each field, as represented diagramatically on FIGS. 8A and 8B, in which the several field lines are designated in the same manner as at the right-hand side of FIG. 10. For example, FIG. 8A shows the addresses at which are written the data for the first field of a particular frame and FIG. 8B shows the addresses at which are written the data for the second field of the same frame, from which it is apparent that, for each field, the data of the sub-blocks corresponding to the same field line are written at the same address of the memory.

It will be appreciated from the above that, if writing in the memory of defective or error-containing sub-block data which cannot be corrected is aborted, then there remains, at the corresponding address, sub-block of the line of the next prior field, which is positioned immediately adjacent to the defective line. For example, if sub-block $SB_3$ containing data for a portion of the second field line $L_{2-2}$ of the second field in FIG. 8B is defective and writing of such data in the memory is stopped, there remains a sub-block $SB_3$ containing data of the second field line $L_{1-2}$ of the first field which is immediately below the error containing second field line $L_{2-2}$. Accordingly, by subsequently merely reading out the data from the addresses of the memory in succession, there can be obtained, as the data of the second field, a signal in which the defective sub-block data has been replaced or concealed by the sub-block data from the line of the previous field which is immediately below the line of the defective sub-block data. The color information of the sub-block data used to replace the error-containing data is the same, and of the same polarity as the color information originally included in the replaced data. However, since the television picture is formed by interlaced scanning, the lines of the first field and the lines of the second field do not coincide, as indicated by solid and broken lines in FIG. 9. Consequently, if the sub-block $SB_3$ in the second field of a frame is replaced with the sub-block $SB_3$ in the first field of the same frame, as described above, their differences in position will cause a discontinuity to occur at the replaced part of the signal which particularly affects the luminance signal component thereof.

Further, when considering lines with the same field line number in the second field of one frame and the first field of the next frame, for example, the line $L_{2-2}$ in the first frame and the line $L_{1-2}$ in the second frame on FIG. 10, it will be appreciated that the line $L_{2-2}$ of the second field of the first frame is positioned above the line $L_{1-2}$ of the first field of the second frame. This is contrary to the relative positioning of lines with the same field line numbers in the first and second fields of the same frame, for example, the line $L_{1-2}$ in the first field of the first frame is positioned below the line $L_{2-2}$ of the second field of the same first frame. Consequently, if an error-containing sub-block of data is to be replaced by a correspondingly numbered sub-block of data of the next previous field, the line of the data used for replacing the error-containing data may be either above or below the error-containing line, and this uncertainty has an adverse affect on the chrominance component. More particularly, it will be seen from FIG. 10 that, although the color information at a sampling point on a particular line is the same as that at the corresponding sampling point on a line in the next previous field which is positioned immediately above the first mentioned line in the pictorial representation of a complete frame, the color information at the two sampling points will be of different polarities. For example, at each sampling point on line $l_{2-1}$, that is, the first line $L_{1-1}$ of the first field in the second frame, the color information is the same as that at the corresponding sampling point on line $l_{1-263}$, that is, the first line of the second field of the first frame, but of the opposite polarity. Thus, error-containing data in the line $l_{2-1}$ cannot be effectively concealed merely by replacing the same with corresponding data from the line $l_{1-263}$ of the next previous field which appears immediately above the line $l_{2-1}$ in the pictorial representation of a complete frame.

It will be appreciated from the foregoing that, even during normal reproducing operations in which each of heads 1A, 1B and 1C reproduces a video signal from only one of the tracks 3A, 3B and 3C, respectively, during each scanning movement across tape 2, the mere replacement of an error-containing sub-block of data of one field by a correspondingly numbered sub-block of data of the next previous field cannot be relied upon to conceal the uncorrected error. In other words, such error concealment is effective if the error-containing sub-block and the same-numbered sub-block of the next previous field are from the same frame, but not if the error occurs in a sub-block containing data of the first field of a frame so that the field of the data contained in the same-numbered sub-block used to replace the error-containing sub-block is from a different frame.

As earlier noted, during non-normal reproducing, for example, high-speed reproducing, the heads 1A, 1B and 1C scan along the line 5 on FIG. 5 so that each of the heads, in scanning across the tape, will reproduce signals from several groups of the tracks 3A, 3B and 3C. Although interchanger 40 redistributes the signals reproduced by heads 1A, 1B and 1C to ensure that only signals reproduced from tracks 3A, 3B and 3C are channelled to error correcting decoders 25A, 25B and 25C, respectively, it will be apparent that the sub-blocks of data thus applied to each decoder 25A, 25B or 25C during a field period for writing in the respective memory will have been derived from a plurality of the tracks 3A, 3B or 3C, respectively. Accordingly, the sub-blocks of data written in the memory in a field period will be a mixture of sub-blocks from different fields, respectively. In that case, the sub-blocks of data successively read-out of the memory in the order of their address signals AD and pertaining to the same field line numbers may nevertheless contain data from first and second fields, respectively. Thus, during high-speed reproducing, even though there is no uncorrected error, the luminance component of the reproduced color video signal is adversely affected by the discontinuity resulting from the fact that successive sub-blocks of data read out of the memory pertain to data of lines in the first and second fields which, although identified by the same field line numbers, occupy different positions on the pictorial representation of a frame.

During high speed reproducing, the color information provided in the sub-blocks read-out of the memory for each channel is also adversely affected by the fact that the successive sub-blocks may relate to the same field line numbers in different fields and/or frames, in which case, even though there is no uncorrected error to be concealed, the color information of successive read-out sub-blocks may have different polarities resulting in a defective color picture if the memory output is employed without further processing.

From the above, it will be appreciated that in the case of an NTSC color video signal, if the reproduced data sub-blocks are written in the memory at predetermined addresses which always conform to the address signals of the respective sub-blocks, both when effecting error concealment in the normal reproducing mode and when effecting a high-speed reproducing operation, the data written at certain addresses in the memory may contain color information of a polarity opposite to that required so that an unnatural color picture will result if the output of the memory is used as is for producing such picture.

Even more acute problems exist in respect to the concealing of uncorrected errors in a PAL color video signal. The level of a PAL color video signal EM is determined by the below equation:

$$EM = E_Y + E_U \sin 2\pi f_{SCP}t \pm E_V \cos 2\pi f_{SCP}t \qquad (3)$$

in which
$E_U = 0.493(E_B - E_Y) \simeq DB_P$
$E_V = 0.877(E_R - E_Y) \simeq DR_P$
$(E_B - E_Y)$: blue color difference signal
$(E_R - E_Y)$: red color difference signal The $(\pm)$ sign before the third term at the right-hand side of equation (3) implies that the phase of $E_V$ or the $(E_R - E_Y)$ axis alternates at every line in accordance with the polarity of the burst signal.

In the case of the PAL color video signal, the color subcarrier frequency $f_{SCP} = (1135/4 + 1/625) f_{HP} = (283 + \frac{3}{4} + 1/625) f_{HP}$, with $f_{HP}$ being the horizontal frequency. Therefore, it will be apparent that the phase of the color subcarrier repeats every four frames.

As will be obvious from equation (3), the $E_V$ or $(E_R - E_Y)$ axis is inverted in phase at every line, while the $E_U$ or $(E_B - E_Y)$ axis is not inverted in phase at every line. Therefore, if data is sampled with respect to the $E_U$ axis by using a sampling frequency of $4f_{SCP}$ as in the previously described case using the NTSC system, it is equivalent to effecting sampling at 0°, 90°, 180° and 270° with respect to the $E_U$ axis. If it is assumed that the phase of the first line in the first field of the first frame $F_1$ starts at 0° in respect to the $E_U$ axis, then the color information and the phases thereof at the sampling points in the first frame $F_1$ through the fourth frame $F_4$ are as shown on FIG. 11.

Figure 11:
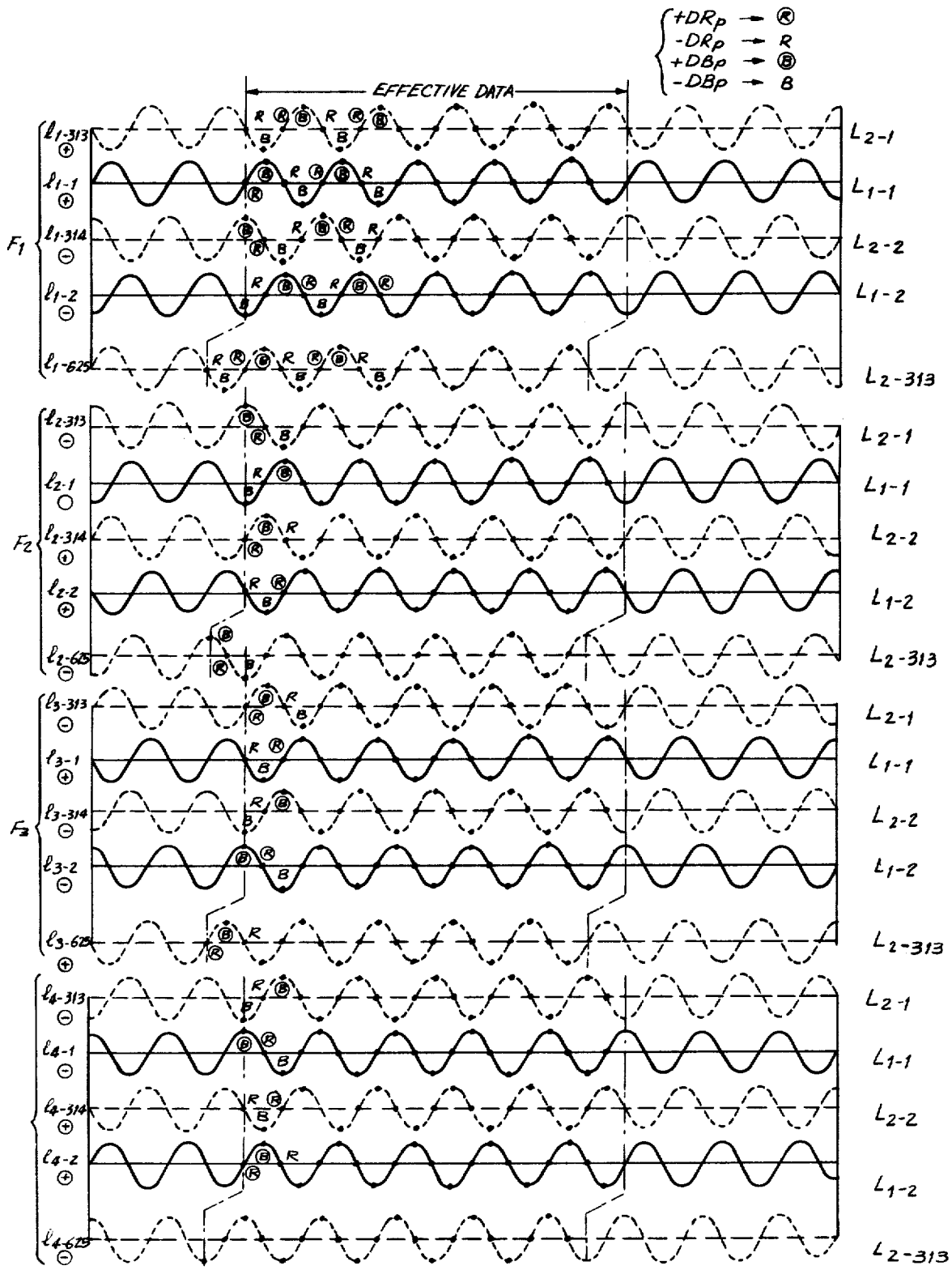
FIG. 11 is a similar graph to which reference will be made in explaining the phase relation of color subcarriers of a PAL color video signal.

Although the color subcarrier frequency $f_{SCP}$ for the PAL system is $(283 + \frac{3}{4} + 1/625)f_{HP}$, as noted above, for the sake of simplicity and clarity of illustration, the curves representing the color subcarrier have been drawn on FIG. 11 as though the color subcarrier frequency is only $(9 + \frac{3}{4} + 1/625)f_{HP}$, and also as though the effective region of each line is only composed of five cycles of the subcarrier.

In FIG. 11, lines in the first field of each frame are again indicated by solid lines, and lines in the second field of each frame are indicated by broken lines, with the phase of the subcarrier being shown superimposed thereon. In the case of the designation of the lines at the left-hand side of FIG. 11, the numbers given to the lines in the first and second fields of each frame are such that the first or odd-numbered field is constituted by the 1st to the 312th lines, for example, as at $l_{1-1}$ to $l_{1-312}$ in the first field of each frame, and the second or even-numbered field is constituted by the 313th or 625th lines, for example, as at $l_{1-313}$ to $l_{1-625}$ in the second field of each frame. However, if the lines are numbered in order for each field, then each first or odd-numbered field will contain field line numbers $L_{1-1}$ to $L_{1-312}$, as indicated at the right-hand side of FIG. 11, and each second or even-numbered field will contain field line numbers $L_{2-1}$ to $L_{2-313}$, also as indicated at the right-hand side of FIG. 11. Considering such field line numbers, it will be seen that, in the pictorial representation of a complete frame, a line in the second or even-numbered field will be disposed immediately above the line of the first or odd-numbered field identified by the same field line number.

In order to indicate that the phase of the red color difference signal $DR_P$ is inverted at every line of the pictorial representation of each complete frame on FIG. 11 in which the polarity of $DR_P$ in the first line of the first field in the first frame is assumed to be positive, a positive polarity of the red color difference signal $DR_P$ in a line is indicated by the symbol $\oplus$ under the respective line number at the left-hand side of FIG. 11 and a negative polarity of the signal $DR_P$ in a line is indicated by a similarly situated symbol $\ominus$. With such an arrangement, the color signal at the sampling points along each line can be obtained by substituting the values of 0°, 90°, 180° and 270° for $2\pi f_{SC} pt$ in equation (3) in the same manner as indicated above for obtaining the values of $S_1$, $S_2$, $S_3$ and $S_4$ in the case of the NTSC system. Thus, at the lines of positive polarity, the color signal becomes $+DR_P$ at 0°, $+DB_P$ at 90°, $-DR_P$ at 180° and $-DB_P$ at 270°, and, at the lines of negative polarity, the color signal becomes $-DR_P$ at 0°, $+DB_P$ at 90°, $+DR_P$ at 180° and $-DB_P$ at 270°. On FIG. 11, the symbols $\circledR$, R, $\circledB$ and B are used to indicate the signal $+DR_P$, $-DR_P$, $+DB_P$ and $-DB_P$, respectively.

As is apparent from FIG. 11, the color information at a sampling point of a particular line and the color information at the corresponding sampling point of a line in the next previous field which is identified by the same field line number, for example, corresponding sampling points on the lines identified as $L_{2-2}$ and $L_{1-2}$ in frame $F_1$ on FIG. 11, are the same as each other but have relatively inverted phases or polarities. On the other hand, the color information at a sampling point on a particular line, for example, the line identified as $L_{1-1}$ in frame $F_2$, is different from the color information at the corresponding sampling point on the same field line number $L_{2-1}$ in the next previous field which is of a different frame, that is, the frame $F_1$.

Accordingly, in the case of a PAL color video signal, if error concealment is attempted in the normal reproducing mode in the manner previously described, that is, by writing each sub-block of data at an address in a memory corresponding to the address signal AD of the sub-block, and by aborting the writing of an error-containing sub-block in the memory so that the data subsequently read-out will contain in place of the error-containing sub-block, a sub-block of the same address signal from the next previous field which may be of the same or a different frame, then the data substituted for the error-containing data will either have the wrong color information or color information of the incorrect polarity and its use without further processing will result in a defective color picture.

It will also be appreciated that, due to the interlaced character of the color picture provided from the PAL color video signal, the same field line numbers in the two fields, for example, the lines $L_{1-2}$ and $L_{2-2}$ in frame $F_1$ on FIG. 11, occupy different positions in the pictorial representation of the frame, and, by reason of such displacement, the data of a sub-block identified by a respective address in one of those lines will differ somewhat, in its luminance component, from the data of the sub-block with the same address in the other of such lines. Therefore, when error concealment is attempted in the described manner, the luminance component of the data substituted for the error-containing data will not precisely correspond to the original luminance component and some discontinuity will result in the color picture reproduced from the signal read out of the memory without further processing.

Moreover, in the case of high speed reproducing of a PAL color video signal, the mixing of sub-blocks from different fields and/or from different frames, in the read out from the memory during a field period results in discontinuities in the luminance information and defects in the color information and/or its polarity, with resulting distortions of the color picture if the latter is produced from the output of the memory without further processing.

Generally, in accordance with the present invention, when the identifying signal ID of a sub-block of data being read out of the memory does not agree, as to frame and field, with a read request signal which identifies the line, field and frame that should then be read out of the memory and which is based on an external reference signal, thereby indicating that the sub-block of data actually being read out is the result of an error concealment in the normal reproducing mode, or of the use of a non-normal or high-speed reproducing mode, the sub-block data being read out of the memory is processed to be substantially consistent, both as to its chrominance and luminance components, with the read request signal. In other words, after processing of the sub-block data being read out of the memory, the kind and polarity of color information contained therein are consistent with the kind and polarity of color information that should be included in a sub-block identified by the read request signal, and at least the luminance level of the processed sub-block data has been compensated for a possible spatial deviation of the line of the sub-block data being read-out of the memory from the line identified by the read request signal.

The conditions for compensating the read-out data in respect to a possible spatial deviation of the respective line from the line of the read request signal will first be described. Since sub-block data of a particular field line number are always written in the same address of the memory, as indicated on FIGS. 8A and 8B, it will be apparent that a spatial or positional deviation of the line of the read-out data relative to the line of the read request signal occurs when both lines belong to different fields. As will be seen from FIG. 9, when the read-out data is in the first field and the line requested to be read out by the read request signal is in the second field, the line of the read request signal is disposed above the line being actually read out. In that case the spatial deviation or misregistration can be compensated by using the read-out data and the corresponding data of the immediately preceding line. Conversely, when the read-out data is in the second field and the line of the read request signal is in the first field, the line of the read request signal is disposed below the line of the data being actually read-out, and the compensation for spatial deviation can be obtained from the read-out data and corresponding data of the immediately following line. Incidentally, especially in the non-normal reproducing mode of the digital VTR, there may be a random distribution of the fields of the sub-blocks of data written in the successive addresses of the memory so that it cannot be determined whether the data of a line which immediately precedes or follows the line of the data being read-out is in the first field or in the second field.

In any event, by way of example, if the read request line is a third field line $L_{2-3}$ of the second field, the read-out data is data of a third field line $L_{1-3}$ of the first field and the data of the line immediately preceding the line $L_{1-3}$ is data of the line $L_{1-2}$ of the first field, the read request line $L_{2-3}$ lies just midway between the lines $L_{1-3}$ and $L_{1-2}$. Accordingly, if values of sample data in lines $L_{1-3}$ and $L_{1-2}$ are represented by $SL_{3(1)}$ and $SL_{2(1)}$, the mean value $SL'_{3(2)}$ is obtained from the following equation:

$$SL'_{3(2)} = \frac{SL_{3(1)} + SL_{2(1)}}{2} \quad (4)$$

Such mean value can be used as the data in the position of the read request line $L_{2-3}$ and the spatial deviation in thereby compensated.

Further, in the above example, if the data of the immediately previous line is data of the line $L_{2-2}$ of the second field, the line $L_{2-2}$ is spatially displaced two lines from the read request line $L_{2-3}$, so that the read request line $L_{2-3}$ lies between the lines $L_{1-3}$ and $L_{2-2}$ but closer to the former rather than to the latter. In that case, by suitably weighting the sample data of both lines, the mean value $SL''_{3(2)}$ can be calculated as follows:

$$SL''_{3(2)} = \frac{2SL_{3(1)} + SL_{2(2)}}{3} \quad (5)$$

Such mean value $SL''_{3(2)}$ can be used as the data of the read request line $L_{2-3}$ so that deviation in the vertical direction can be compensated thereby.

Since the arrangements of the color information are different for the NTSC and PAL systems, the conditions for obtaining color information which agrees, in kind and in polarity, with the color information called for by the read request signal will be separately described.

In the NTSC system, when the field of the read request signal is the same as the field of the data being read out but the frames thereof are different, then the color information being read out is of the kind ($E_R - E_Y$ or $E_B - E_Y$) called for by the read request signal, but of opposite polarity thereto. Accordingly, in the case of an NTSC color video signal, an apparatus embodying this invention compares the frame of the read-out sub-block indicated by the identifying signal ID thereof with the frame indicated by the read request signal and, in the event of a disparity between the compared frames, the polarity of the color information is inverted prior to being combined with the luminance signal which has been compensated for spatial deviation as described generally above.

Referring now to FIG. 12, it will be seen that the left-hand portion of the table thereon shows eight possible relationships, identified as [CASE 1] to [CASE 8], of the fields to which data of three lines $L_{n-1}$, $L_n$ and $L_{n+1}$ in the field memory may belong and the field of a read request signal $RL_n$ which identifies the line $L_n$. In such portion of the table of FIG. 12, the numerals "1" and "2" refer to the first and second fields, respectively, in which are contained the data of the lines $L_{n-1}$, $L_n$ and $L_{n+1}$, and the first and second fields, respectively, being identified by the read request signal $RL_n$. Thus, in [CASE 1], [CASE 2], [CASE 7] and [CASE 8] in which the field of the read request line $RL_n$ and the field of the line $L_n$ of the read-out data agree with each other, a luminance component $Y_N$ and a color or chrominance component $C_N$ corresponding to the read request signal are basically the data of the line $L_n$ being read out without modification. If, however, the frame to which the read-out data belongs differs from the frame of the read request signal, the polarity of the chrominance component of the read-out data has to be inverted due to the previously described characteristics of the NTSC color video signal.

In [CASE3], [CASE4], [CASE5] and [CASE6], in which the field of the read request signal $RL_n$ and the field of the line $L_n$ do not agree with other, the magnitudes of the luminance component $Y_N$ and the chrominance component $C_N$ are desirably calculated, in accordance with equations (4) and (5) above, so as to obtain interpolated values which closely conform to the values thereof for the read request signal. In such cases also, the polarity of the chrominance component is reversed if the frame to which the read-out data belongs differs from the frame of the read request signal.

Since the chrominance component of the line above or below a certain line may be of a polarity which is the reverse of that of such line, in the case of the interpolation of the chrominance component, the absolute value of each chrominance component is first obtained and the calculations indicated on FIG. 12 are conducted using such absolute values, whereupon the polarity of the result is determined.

Since the band of the chrominance component (a color difference signal) is narrower than the band of the luminance component, even if the above described interpolation is effected only in respect to the luminance component and not in respect to the chrominance component which only has its polarity considered, a substantially satisfactory color picture can still be obtained. Further, since error concealment is performed in the normal reproducing mode of the VTR, the identifying signals ID of the sub-blocks of data being read-out of the memory will, for the most part, identify the same fields as the simultaneously occurring read request signals, and only the data used for concealing an error-containing sub-block of data (that is, data which was left at the respective address in the memory when the writing therein of the error-containing data was aborted) will belong to a field which is next previous in respect to the field of the read request signal. Thus, [CASE 4] and [CASE 6] correspond to the situations encountered during error concealment.

A video signal processing apparatus according to an embodiment of this invention will now be described in detail with reference to FIG. 13. The apparatus of FIG. 13 may be employed in each of the error correcting decoders 25A, 25B and 25C of the reproducing section of FIG. 2 when an NTSC color video signal is being processed. In the specific embodiment of FIG. 13, line interpolation is effected only in respect to the luminance component of the reproduced signal, that is, line interpolation is omitted in respect to the chrominance component for the reason given above.

The processing apparatus of FIG. 13 is shown to comprise a memory device 51 having a capacity suitable for memorizing the data for one channel of a field of the video signal. The memory device 51 may be formed of a random access memory (RAM) and its surrounding control circuit, and is supplied, at an input 52, with the reproduced digital color video signal from the time base corrector 23A, 23B or 23C, respectively, of FIG. 2, by way of interchanger 24 or with a reproduced digital color video signal which has been error-corrected to the extent possible by the horizontal parity and vertical parity in an error correcting circuit (not shown) which forms no part of the present invention.

Another memory device 53 is provided for memorizing the identifying signal ID contained in each sub-block of the digital video signal applied to terminal 52, and which is separated from such digital video signal by an identifying signal extracting circuit 53a. The memory device 53 is also formed of a random access memory (RAM) and its surrounding control circuit. The digital video signal from input terminal 52 is further supplied to an address signal extracting circuit 51a to obtain the address signal AD from each sub-block, and such extracted address signal is supplied to an address control circuit 51b.

The control circuit 51b may include, for example, a read-only memory (ROM) which provides an address map by which an actual absolute address is derived in response to the address signal AD extracted from a sub-block by circuit 51a. In other words, the address signal AD extracted from each sub-block causes the ROM of control circuit 51b to provide an address code identifying actual addresses in memory devices 51 and 53 at which the data and the ID signal of such sub-block are to be written, and also to determine the addresses in memory devices 51 and 53 from which information data and an ID signal are thereafter read. Thus, the data of the several sub-blocks are written in memory 51 at addresses in the latter which are predetermined for the respective sub-blocks.

Since it is not possible to perform reading and writing operations at the same time in a random access memory, the RAMs of memory devices 51 and 53 are provided with a memory cycle divided into an initial writing operation and a later reading operation which, for example, may be delayed by one field period relative to the writing operation.

Further, in the embodiment of this invention illustrated on FIG. 13, the reproduced digital color video signal from input terminal 52 is supplied to a dropout or error detector circuit 51c to detect a sub-block having an error in the input digital color video signal which has not been conventionally corrected by the horizontal parity and the vertical parity. When such uncorrected error is detected, the resulting signal from circuit 51c is supplied to memory devices 51 and 53 to stop writing therein of the data and identifying signal, respectively, of the erroneous sub-block.

The data read out from the successive addresses in memory 51 are supplied to a digital separating filter 54 in which the luminance component $Y_N$ and the chrominance component $C_N$ thereof are separated from each other.

The luminance signal component $Y_N$ is applied to a delay circuit 55 wherein it is delayed by a time $\tau H$ corresponding to the period of the data for one line of one channel. The output from delay circuit 55 is supplied to a delay circuit 56, wherein it is further delayed by $\tau H$. When the line of the read request signal is the nth field line $L_n$, the reading operation of the memories 51 and 53 is controlled by address control circuit 51c so that the luminance signal component available from filter 54 is $(SL_{n+1})_Y$, the output from delay circuit 55 is $(SL_n)_Y$ of the immediately previous line, and the output from delay circuit 56 is $(SL_{n-1})_Y$ of the line before the immediately previous line.

The outputs $(SL_n)_Y$ and $(SL_{n-1})_Y$ from delay circuits 55 and 56, respectively, are applied to respective calculators 57 and 58. In calculator 57, $$\frac{(SL_n)_Y + (SL_{n-1})_Y}{2}$$

is calculated to provide an output $Y_{N3}$, and in calculator 58, $$\frac{2(SL_n)_Y + (SL_{n-1})_Y}{3}$$

is calculated to provide an output $Y_{N4}$. Further, the output $(SL_{n+1})_Y$ from digital filter 54 and the output $(SL_n)_Y$ from delay circuit 55 are applied to respective calculators 59 and 60. In calculator 59, $$\frac{(SL_n)_Y + (SL_{n+1})_Y}{2}$$

is calculated to provide an output $Y_{N5}$, and in calculator 60, $$\frac{2(SL_n)_Y + (SL_{n+1})_Y}{3}$$

is calculated to provide an output $Y_{N6}$.

These outputs $Y_{N3}$, $Y_{N4}$, $Y_{N5}$ and $Y_{N6}$ and the output $(SL_n)_Y$ from delay circuit 55 (corresponding to $Y_{1,2}$ and $Y_{7,8}$ in FIG. 12) are applied to a multiplexer 61 which is controlled as hereinafter described in detail so that the luminance component obtained at the output of multiplexer 61 will, at all times, be free of any spatial deviation in respect to the line, field and frame identified by the read request signal.

The chrominance component from digital filter 54 is fed to a delay circuit 62 having a delay $\tau H$. Accordingly, the output $C_N$ from the delay circuit 62 becomes a chrominance component $(SL_n)_C$ of the line requested to be read out. The output $C_N$ is applied directly to a multiplexer 63 and, at the same time, to a digital polarity inverter circuit 64 by which the polarity of the chrominance component $C_N$ is inverted to $-C_N$, which is then supplied to multiplexer 63. The multiplexer 63 is controlled as hereinafter described in detail so that either the chrominance component $C_N$ or $-C_N$ appears at the output of multiplexer 63 to have a polarity agreeing with that of the frame identified by the read request signal.

The color signal or chrominance component and the luminance component thus obtained from multiplexers 63 and 61, respectively, are combined by an adder 65 into a composite digital color video signal, and the composite digital color video signal data is supplied to a multiplexer 66. The data read out from memory 51 are further applied to multiplexer 66 through a delay circuit 67, wherein the data are delayed by the sum of the delay time $\tau F$ of digital filter 54 and the delay time $\tau H$ so that the timing of the data reaching multiplexer 66 through delay circuit 67 will agree with the timing of the data from adder 65.

The multiplexer 66 is controlled, as hereinafter described in detail, to determine whether the output of delay circuit 67 or the output of adder 65 appears at a terminal 68 connected to the output of multiplexer 66 on the basis of whether or not the frame and field of the data actually being read out agree with the frame and field of the read request signal.

The control signals for controlling multiplexers 61, 63 and 66 are provided in a multiplexer control circuit 70 from the identifying signals ID successively read out of memory 53 and from reference identifying signals serving as the read request signal and which are derived from the control signal generator 33 on FIG. 2. More particularly, in the multiplexer control circuit 70 as shown on FIG. 13, each identifying signal ID read out from the memory 53 is applied through a delay circuit 71 with a delay time $\tau F$ to a frame and field identifying signal detector circuit 72 by which a frame identifying signal FL and a field identifying signal FI are detected. In the illustrated example, the field identifying signal FI and the frame identifying signal FL are selected to be "1", for example, in the case of the first field and the first frame, respectively, and to be "0" in the case of the second field and the second frame, respectively.

The frame identifying signal FL is applied to a circuit 73 with a delay $\tau H$, and consequently, when the identifying signal for the line $L_{n+1}$ is being readout of memory 53, the output from delay circuit 73 becomes a frame identifying signal $FL_n$ for the data of line $L_N$. The field identifying signal FI is fed to a delay circuit 74 with a delay $\tau H$ and its output is further provided to a delay circuit 75 with a delay $\tau H$. As a consequence, the detector circuit 72 provides a field identifying signal $FI_{n+1}$ for the data of the line $L_{n+1}$ being read out of memory 53, the delay circuit 74 provides, at its output, a field identifying signal $FI_n$ for the data of the line $L_n$, and the delay circuit 75 provides, at its output, a field identifying signal $FI_{n-1}$ for the data of the line $L_{n-1}$.

A frame identifying signal $RFL_n$ of the read request signal and a field identifying signal $RFI_n$ of the read request signal are respectively applied through terminals 76 and 77 to exclusive NOR gates 78 and 79, respectively. The frame identifying signal $FL_n$ from delay circuit 73 and the field identifying signal $FI_n$ from delay circuit 74 are also applied to gates 78 and 79, respectively. Accordingly, gate 78 provides an output "1" when the frame of the data of the read-out sub-block agrees with the frame identified by the read request signal, and the output of gate 78 is "0" when the frame of the read-out sub-block data is different from the frame of the read request signal. Similarly, gate 79 provides an output "1" or "0" in dependence on whether the field of the read-out sub-block data does or does not, respectively, agree with the field of the read request signal.

The outputs from gates 78 and 79 are supplied to an AND gate 80, from which is derived a control signal $CT_A$ which is "1" only when both the field and frame of the read-out sub-block data are the same as the field and frame, respectively, of the read request signal, and which is otherwise "0". The control signal $CT_A$ is used to control multiplexer 66 from which is derived, at output terminal 68, the output from delay circuit 67 when signal $CT_A$ is "1" and the output from adder 65 when signal $CT_A$ is "0".

An inverted signal $\overline{CT_A}$ is obtained through an inverter 80a from the output of AND gate 80 and is applied, along with the output of gate 78, to respective inputs of an AND gate 81, from which is obtained a control signal $CT_B$ for the multiplexer 63. The control signal $CT_B$ is "1" only when the frames of the readout sub-block data and of the read request signal are the same and the fields thereof are different, and control signal $CT_B$ is "0" whenever the frame of the read-out sub-block data is different from the frame of the read request signal. Further, multiplexer 63 responds to control signal $CT_B$ to select the inverted chrominance signal $-C_N$ at the output of polarity inverting circuit 64 when signal $CT_B$ is "0", that is, whenever the frame of the read-out sub-block data is different from the frame of the read request signal, and to otherwise select the chrominance signal $C_N$ as the output of multiplexer 63.

The output $\overline{CT_A}$ and the output from NOR gate 79 are supplied to an AND gate 82, from which is obtained a signal $CT_{1,2,7,8}$ which is "1" only when the field of the read-out sub-block data is the same as the field of the read request signal, regardless of their frames, and which is "0" otherwise. The signal $CT_{1,2,7,8}$ is applied to multiplexer 61 and causes the latter to select the luminance component $Y_{1,2,7,8}$ for delivery to adder 65, as in [CASE 1], [CASE 2], [CASE 7] or [CASE 8] on FIG. 12, whenever the signal $\overline{CT}_{1,2,7,8}$ is "1".

An inverted output $\overline{CT}_{1,2,7,8}$ is obtained through an inverter 82a from AND gate 82 and is applied to AND gates 83 and 84, which are also respectively supplied with the field identifying signal $FI_n$ from delay circuit 74 and an inverted signal $\overline{FI_n}$ obtained through an inverter 84a. Consequently, AND gate 83 provides signal $R_2$ which is "1" when the field of the read-out sub-block data differs from the field of the read request signal and the field of the read request signal is the second field. In other words, the signal $R_2$ is "1" when the read request signal identifies the second field and the read-out sub-block data is from the first field. Conversely, AND gate 84 provides a signal $R_1$ which "1" when the read-out sub-block data is from the second field and the read request signal identifies the first field. The output $R_2$ from AND gate 83 is shown to be applied to AND gates 85 and 86, and the output $R_1$ from AND gate 84 is supplied to AND gates 87 and 88.

The field identifying signal $FI_n$ from delay circuit 74 and the field identifying signal $FI_{n+1}$ from delay circuit 75 are applied to an exclusive NOR gate 89 providing an output which is "1" when both signals $FI_n$ and $FI_{n-1}$ are the same, that is, identify the same fields, and which is "0" when signals $FI_n$ and $FI_{n-1}$ identify different fields. The output of gate 89 is supplied to AND gate 85 and its inverted signal is fed through an inverter 89a to AND gate 86.

Accordingly, there is obtained from AND gate 85 a signal $CT_3$ which is "1" when the read request signal identifies the second field and the data of the lines $L_n$ and $L_{n-1}$ are both in first fields. The AND gate 86 provides a signal $CT_4$ which is "1" when the read request signal identifies the second field, the data of the line $L_n$ is in the first field and the data of the line $L_{n-1}$ is in the second field. In other words, the signals $CT_3$ and $CT_4$ each become "1" when the conditions defined as [CASE 3] and [CASE 4], respectively, on FIG. 12 are encountered. The signals $CT_3$ and $CT_4$ are applied, as control signals, to multiplexer 61 to cause the latter to supply the interpolated luminance component $Y_{N3}$, or the interpolated luminance component $Y_{N4}$ to adder 65 when control signal $CT_3$ is "1", or when control signal $CT_4$ is "1", respectively.

The field identifying signal $FI_n$ from delay circuit 74 and the field identifying signal $FI_{n+1}$ from detector circuit 72 are applied to an exclusive NOR gate 90, so that the output of gate 90 is "1" only when field identifying signals $FI_n$ and $FI_{n+1}$ are equal. Such output from gate 90 is applied to AND gate 87 and is inverted, as in an inverter 90a, prior to being applied to AND gate 88.

The output of AND gate 87 constitutes a control signal $CT_5$ which is "1" when the read request signal identifies the first field and the data of the lines $L_n$ and $L_{n+1}$ are both from second fields. The output of AND gate 88 constitutes a control signal $CT_6$ which is "1" when the read request signal identifies the first field, the data of line $L_n$ is from a second field and the data of line $L_{n+1}$ is from a first field.

Thus, the signals $CT_5$ and $CT_6$ each become "1" on encountering the conditions defined as [CASE 5] and [CASE 6], respectively, on FIG. 12. The signals $CT_5$ and $CT_6$ are applied, as control signals, to multiplexer 61 so that the latter supplies the interpolated luminance component $Y_{N5}$, or the interpolated luminance component $Y_{N6}$ to adder 65 when the control signal $CT_5$ is "1" or the control signal $CT_6$ is "1", respectively.

It will be appreciated that, when each of error-correcting decoders 25A, 25B and 25C of the reproducing section (FIG. 2) of a digital VTR embodies the circuit arrangement of FIG. 13 for processing the reproduced NTSC color video signal data in the respective channel, multiplexer 66 is conditioned by control signal $CT_A$ to select the output of delay circuit 67 for transmission to output terminal 68 so long as the VTR is in its normal reproducing mode and there is no uncorrected error in any of the sub-blocks of data successively written in, and then read out from memory 51. However, if there is an uncorrected error in a sub-block of data supplied to memory 51, so that the writing of such error-containing sub-block of data in memory 51 and the writing of the respective identifying signal in memory 53 are aborted, then the identifying signal ID read out of memory 53 simultaneously with the read out of the sub-block of data from memory 51 to replace, and thereby conceal the error-containing sub-block, will not conform, at least in its field, and possibly also in its frame, with the field and frame, respectively, identified by the read request signal, as applied to terminals 77 and 76. If the fields of the read-out sub-block data and the read request signal are different but the frames thereof are the same, control signal $CT_A$ is "0" to cause multiplexer 66 to select the output of adder 65, and control signal $CT_B$ is "1" to cause multiplexer 63 to select the output $C_N$ of delay circuit 62 for transmission to adder 65. Since the field identified by the signal ID read out of memory 53 is different from the field identified by the read request signal, but the frames thereof are the same, it is clear that the second field is identified by the read request signal and the first field is identified by the signal ID read out of memory 53. In that case, either the signal $CT_3$ or the signal $CT_4$ is "1" depending upon the field of the line $L_{n-1}$ read out prior to the line $L_n$ being then read out of memory 51, so that multiplexer 61 is controlled to select either the luminance component $Y_{N3}$ or the luminance component $Y_{N4}$. Thus, in the normal reproducing mode of the VTR, the occurrence of an uncorrected error in a sub-block of data of a second field is concealed by replacing such sub-block of data with a composite signal made up of the chrominance component of the corresponding sub-block of data in the next previous field, that is, the first field of the same frame, and an interpolated luminance component calculated from the expression for $Y_{N3}$ or $Y_{N4}$ on FIG. 12.

If, in the normal reproducing mode, an uncorrected error appears in a sub-block data of a first field, and thus is to be replaced or concealed by the corresponding sub-block of data in the next previous field, that is, in the second field of the earlier frame, then the field and frame identified by the signal ID being read out of memory 53 are different from the field and frame, respectively, of the read request signal. In response thereto, control signal $CT_B$ is "0" so that multiplexer 63 selects the chrominance component $-C_N$ from polarity inverter 64 for transmission to adder 65. Further, in response to the read-out data being of a second field while the simultaneously occurring read request signal identifies the first field, either the control signal $CT_5$ or the control signal $CT_6$ is "1" to cause multiplexer 61 to select the luminance component $Y_{N5}$ or $Y_{N6}$ for transmission to adder 65. The selection of $Y_{N5}$ or $Y_{N6}$ is dependent on the field of the line $L_{n+1}$ to be read out of memory 51 following the read out of the line $L_n$. Accordingly, in the normal reproducing mode, the processing apparatus of FIG. 13 is effective to conceal an uncorrected error occurring in data of a first field by replacing the error-containing data with a composite signal composed of the suitably interpolated luminance component $Y_{N5}$ or $Y_{N6}$ of FIG. 12 and of the chrominance component of the corresponding data in the second field of the previous frame, but with its polarity inverted.

It will further be appreciated that, when the digital VTR is in a not-normal reproducing mode, such as, the high speed reproducing mode in which data from several fields and/or frames may be reproduced and applied to a channel during a single field period, the multiplexer control circuit 70 of the processing apparatus shown on FIG. 13 suitably controls the multiplexers 61, 63 and 66 so that, in the absence of any error concealment operation, multiplexer 66 provides the data read out of memory 51 through delay circuit 67 to output terminal 68 so long as the field and frame of the data being read out from memory 51 correspond with the field and frame, respectively, identified by the read request signal. However, if by reason of the high speed reproducing operation of the VTR the field and/or frame of the data being read out of memory 51 and identified by the signal ID being simultaneously read out of memory 53 are/is different from the field and/or frame identified by the read request signal, then multiplexer 66 selects the output of adder 65. If the data being read out of memory 51 is of the same field as the read request signal, but of a different frame, then multiplexer 61 is made to select the luminance component $Y_{1,2,7,8}$ directly from delay circuit 55, and multiplexer 63 is made to select the chrominance component $-C_N$ of inverted polarity to be formed into a composite signal in adder 65 for transmission through multiplexer 66 to terminal 68. On the other hand, if the data being read out of memory 51 is of a field different from that identified by the read request signal, multiplexer 61 is controlled to suitably select the interpolated luminance component $Y_{N3}$, $Y_{N4}$, $Y_{N5}$ or $Y_{N6}$ for combining in adder 65 with either the chrominance component $C_N$ or the chrominance component $-C_N$ of inverted polarity, in dependence on the relation of the frame of the data being read out of memory 51 to the frame identified by the read request signal.

It will be appreciated from the foregoing that the processing apparatus of FIG. 13 ensures that, when reproducing an NTSC color video signal, error concealment in the normal reproducing mode or the non-normal reproducing mode can be effected without distortion or discontinuities in the reproduced color picture.

In the case of a PAL color video signal, as distinguished from a color video signal of the NTSC system, even if data is sampled at positions arranged in alignment in the vertical direction on adjacent lines, the follow the sampling point for which the color difference signal is being determined, thereby to provide values for the red and blue color difference signals at all sampling points as shown in the below table:

| Information | Sample point | | | | | |
|---|---|---|---|---|---|---|
| | 1 | 2 | 3 | 4 | 5 | 6 |
| $DR_P$ information | $DR_{P1}$ | $\dfrac{DR_{P1} + DR_{P3}}{2}$ | $DR_{P3}$ | $\dfrac{DR_{P3} + DR_{P5}}{2}$ | $DR_{P5}$ | $\dfrac{DR_{P5} + DR_{P7}}{2}$ |
| $DB_P$ information | $\dfrac{DB_{P0} + DB_{P2}}{2}$ | $DB_{P2}$ | $\dfrac{DB_{P2} + DB_{P4}}{2}$ | $DB_{P4}$ | $\dfrac{DB_{P4} + DB_{P6}}{2}$ | $DB_{P6}$ | color information and the polarity thereof are not readily determined, for example, in the case of the sampling frequency being $4f_{SCP}$, the sampled data can be any one of $Y_P \pm DR_P$ and $Y_P \pm DB_P$.

Accordingly, in the case of a PAL color video signal, for example, during non-normal or high-speed reproducing, it is impossible to obtain a color signal which agrees with the read request signal only by suitable consideration of the polarity of the chrominance component separated by a filter, as in the case of the NTSC system.

Therefore, in accordance with the present invention, in the case of the PAL system, the chrominance component is demodulated into a color difference signal and converted into luminance-like information, and the color difference signal is calculated to provide a color or chrominance signal which is consistent with the read request signal.

Although the luminance component $Y_P$ of the reproduced PAL color video signal can be calculated or simply interpolated from luminance components separated by a digital filter out of data of lines immediately above and below the line which is identified by the read request signal, similarly to what has been described in detail for the NTSC system, a similar simple interpolation cannot be relied upon for obtaining the chrominance component for the below reasons.

If the PAL color video signal is sampled with a sampling frequency $4f_{SCP}$, the color difference signal components $DR_P$ and $DB_P$ (considered as absolute values, that is, without regard to their polarities) at a succession of locations or points along a certain line, for example, the first line of the first field in the first frame, are as shown in the following table:

| Information | Sample point | | | | | |
|---|---|---|---|---|---|---|
| | 1 | 2 | 3 | 4 | 5 | 6 |
| $DR_P$ information | $DR_{P1}$ | | $DR_{P3}$ | | $DR_{P5}$ | |
| $DB_P$ information | | $DB_{P2}$ | | $DB_{P4}$ | | $DB_{P6}$ |

As will be seen from the above table, there is no value for one as the other of the color difference signals $DR_P$ and $DB_P$ at each of the sampling points, so that, in the absence of a process or calculation to supply the missing color difference signals, it would not be possible to provide a chrominance component which would agree with the read request signal.

More particularly, in accordance with this invention, the value of each missing color difference signal at a sampling point is obtained by interpolation, from the values of the corresponding color difference signals at the sampling points which immediately precede and The above identified interpolations used for obtaining the values of the color difference signals at each sampling point are hereinafter referred to as "sample-interpolations" to distinguish the same from the "line-interpolations" used for determining values of the luminance component.

In the case of the processing of the NTSC color video signal, the line identification by the identification signal ID has not been employed, but such is not the case with the PAL system where the line identification is used as part of the read request signal.

Further, in the case of the PAL system, if the phase of a color subcarrier is considered, all lines can be divided into four kinds, so that, if the kind of a line is known, the condition of color signal information in that line can be known. For example, in the case of the sampling frequency $4f_{SCP}$, the lines can be classified into the following four kinds in terms of the arrangement of color information, starting with the sample at the left-hand end of the effective data of each line shown on FIG. 11:

1. A first kind of line in which the color difference signals repeat in a cyclic order of $+DR_P$, $+DB_P$, $-DR_P$, $-DB_P$, $+DB_P$, ... (for example, line $l_{1\text{-}1}$);
2. A second kind of line in which the color difference signals repeat in a cyclic order of $-DB_P$, $-DR_P$, $+DB_P$, $+DR_P$, $-DB_P$, $-DR_P$, ... (for example, line $l_{1\text{-}2}$);
3. A third kind of line in which the color difference signals repeat in a cyclic order of $-DR_P$, $-DB_P$, $+DR_P$, $+DB_P$, $-DR_P$, $-DB_P$, ... (for example $l_{1\text{-}313}$); and
4. A fourth kind of line in which the color difference signals repeat in a cyclic order of $+DB_P$, $+DR_P$, $-DB_P$, $-DR_P$, $+DB_P$, $+DR_P$, ... (for example, line $l_{1\text{-}314}$).

In order to identify such first, second, third and fourth kinds of lines of the PAL signal, 2-bit codes [11], [00], [10] and [01] are respectively added, as the line ID, to each of the sub-blocks in such lines. Therefore, by detecting the 2-bit code identifying the kind of line of a read-out sub-block and comparing the same with the line of the read request signal, it is possible to determine what processing of the read-out sub-block data is necessary to agree with the read request signal.

Referring now to FIG 14, it will be seen that the circumstances which require the so-called line interpolation are exactly the same in the case of a PAL signal as in the case of an NTSC signal. More particularly, for the circumstances previously defined as [CASE 1], [CASE 2], [CASE 3], [CASE 4], [CASE 5], [CASE 6], [CASE 7] and [CASE 8], the arithmetic operations or calculations in equations (4) and (5) are performed for the luminance component $Y_P$ and the chrominance component $C_P$ to obtain the line-interpolated values therefor shown in the table of FIG. 14. Moreover, in the case of a PAL signal, the color signal or chrominance component is line-interpolated for each color difference signal and sample-interpolated data $ISL_n$, $ISL_{n-1}$, $ISL_{n+1}$ are used as the data of the color difference signal.

As in the case of the NTSC system, when error concealment is being effected with a PAL color video signal, the aborting of the writing of the error-containing data in the respective memory ensures that the circumstances of [CASE 4] or [CASE 6] will be encountered during read-out.

Figure 15:
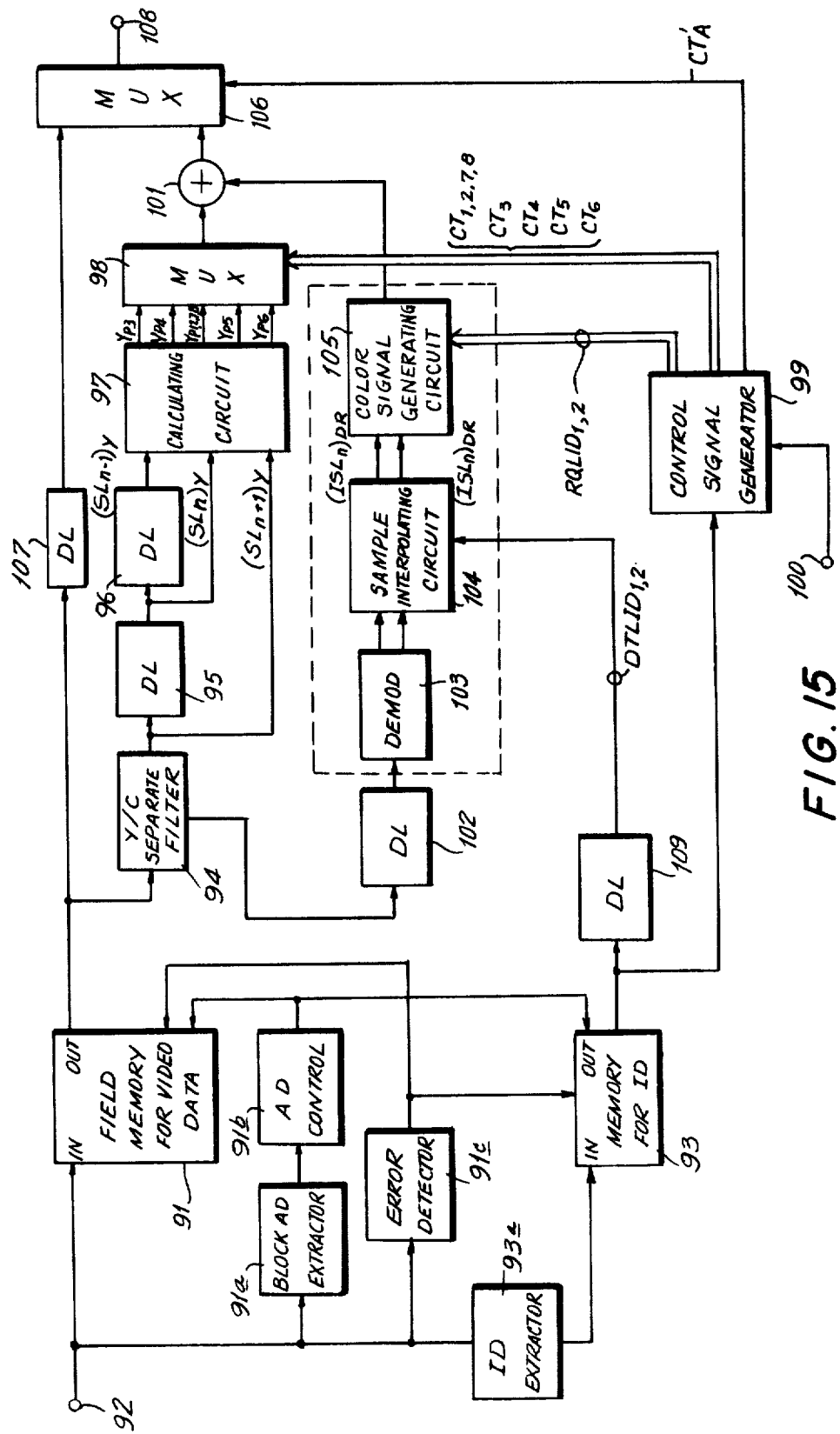
FIG. 15 is a block diagram showing a video signal processing apparatus according to another embodiment of the invention for effecting the processing explained with reference to FIG. 14.

As noted previously, since the band of the color difference signal is narrower than that of the luminance component, substantially satisfactory results can also be obtained in practice, even if no line interpolation is carried out in respect to the color difference component of the PAL signal. In this connection, FIG. 15 illustrates an embodiment of an apparatus for processing a PAL color video signal according to this invention, and in which no line interpolation is performed for the color difference component. As in the case of FIG. 13, the apparatus of FIG. 15 is also intended to be employed in each error correcting decoder 25A, 25B and 25C of the digital VTR for processing the data in the respective channel.

The processing apparatus of FIG. 15 is shown to comprise a memory device 91 having a capacity suitable for memorizing the data for one channel of a field of the video signal. The memory device 91 may be formed of a random access memory (RAM) and its surrounding control circuit, and is supplied, at an input 92, with the reproduced digital PAL color video signal from time base corrector 23A, 23B or 23C, respectively, of FIG. 2, by way of interchanger 24 or with a reproduced digital PAL color video signal which has been error-corrected to the extent possible by the horizontal parity and vertical parity in an error correcting circuit (not shown) which as earlier noted forms no part of the present invention.

Another memory device 93 is provided for memorizing the identifying signal ID contained in each sub-block of the digital video signal applied to terminal 92, and which is separated from such digital video signal by an identifying signal extracting circuit 93a. The memory device 93 is also formed of a random access memory (RAM) and its surrounding control circuit. The digital video signal from input terminal 92 is further supplied to an address signal extracting circuit 91a to obtain the address signal AD from each sub-block, and each extracted address signal is supplied to an address control circuit 91b.

The control circuit 91b may include, for example, a read-only memory (ROM) which provides an address map by which an actual absolute address is derived in response to the address signal AD extracted from a sub-block by circuit 91a. In other words, the address signal AD extracted from each sub-block causes control circuit 91b to determine the addresses in memory devices 91 and 93 at which the data and the ID signal of such sub-block are to be written, and also to determine the addresses in memory devices 91 and 93 from which information data and an ID signal are thereafter read, in the same way as has been earlier described with reference to the apparatus of FIG. 13 for an NTSC color video signal. As before, the reproduced digital color video signal from input terminal 92 is supplied to a dropout or error detector circuit 91c to detect a sub-block having an error in the input digital color video signal which has not been conventionally corrected by the horizontal parity and the vertical parity, and to stop writing in memory devices 91 and 93 of the data and identifying signal, respectively, of the erroneous sub-block.

The data read out from the successive addresses in memory 91 are supplied to a digital separating filter 94 in which the luminance and chrominance components thereof are separated from each other.

The luminance component is applied to a delay circuit 95 wherein it is delayed by a time $\tau H$ corresponding to the period of the data for one line of one channel. The output from delay circuit 95 is supplied to a delay circuit 96, wherein it is further delayed by $\tau H$. When the line of the read request signal is the nth field line $L_n$, the reading operation of the memories 91 and 93 is controlled so that the luminance signal component available from filter 94 is $(SL_{n+1})_Y$ for the line $L_{n+1}$, the output from delay circuit 95 is $(SL_n)_Y$ of the immediately previous line corresponding to the read request line, and the output from delay circuit 96 is $(SL_{n-1})_Y$ of the line before the immediately previous line.

These outputs $(SL_{n+1})_Y$, $(SL_n)_Y$ and $(SL_{n-1})_Y$ are applied to a calculating circuit 97 corresponding to the calculators 57-60 of FIG. 13 and in which are conducted the same operations as have been described with reference to FIG. 13 for the NTSC system to provide the luminance component outputs $Y_{P3}$, $Y_{P4}$, $Y_{P1,2,7,8}$, $Y_{P5}$ and $Y_{P6}$, which are supplied to a multiplexer 98.

Moreover, an identifying signal read out from memory 93 is applied to a control signal generator circuit 99 corresponding to the circuit 70 of FIG. 13 and which also receives, through a terminal 100, an identifying or read request signal formed by an external reference signal. From the frame and field identifying signals of the read-out identifying signal from memory 93 and of the read request signal, the circuit 99 forms control signals $CT_{1,2,7,8}$, $CT_3$, $CT_4$, $CT_5$ and $CT_6$ in the same manner as has been described with reference to FIG. 13. These control signals are supplied to multiplexer 98 to derive therefrom the correct luminance component for the conditions encountered, and the correct luminance component is supplied to an adder 101.

The chrominance component separated by digital filter 94 is applied to a delay circuit 102 which establishes the correct timed relation in respect to the luminance component. The chrominance component from delay circuit 102 is applied to a color demodulating circuit 103 to obtain therefrom red and blue color difference signals which are applied to a sample interpolating circuit 104.

Further, the sample interpolating circuit 104 is supplied with the identifying signals read-out from memory 93, and the line identifying signal included therein is the basis for detecting whether the polarity of the color difference signal in the sampled data has been inverted, whereupon such polarity is made positive. The data, in which the polarity of the color difference signal has thus been made positive for all samples, are sample-interpolated every other sample in connection with each color difference signal, using values of the immediately preceding and following samples, as described previously, and the resulting outputs $(ISL_n)_{DR}$ and $(ISL_n)_{DB}$ are both supplied to a color signal generating circuit 105.

Further, the control signal generating circuit 99 provides control signals RQLID$_{1,2}$ formed from the line ID of the read request signal, and such control signals are applied to color signal generating circuit 105 to cause the latter to provide a chrominance component which has the color information and the phase called for by the line ID of the read request signal. Such chrominance component from circuit 105 is applied to adder 101 where it is combined with the luminance component from multiplexer 98 to form a composite color video signal which is supplied to a multiplexer 106. The data read out from memory 91 is also applied to a delay circuit 107, wherein it is delayed by the sum of the delays of digital filter 94 and delay circuit 95 for synchronization with the output from adder 101, prior to being applied to multiplexer 106.

The control signal generating circuit 99, similarly to the circuit 70 described with reference to FIG. 13, makes a comparison between the identifying signal read out of memory 93 and the read request signal to provide a control signal CT'$_A$ which has the value "1" only when the identifying signal and the read request signal coincide with each other in all respects, that is, as to frame, field and line. This control signal CT'$_A$ is applied to multiplexer 106, from which is obtained the output from delay circuit 107 when the control signal CT'$_A$ is "1", or the output from adder 101 when control signal CT'$_A$ is "0". Such output from multiplexer 106 is supplied to an output terminal 108 which constitutes the input to the time base expander 26A, 26B or 26C which is next in line in the respective channel of the reproducing section. Finally, in the processing circuit according to this invention, as shown on FIG. 15, a delay circuit 109 is located between ID memory 93 and sample interpolating circuit 104 to achieve synchronization between the data and the identifying signal at sample interpolating circuit 104.

Figure 16:
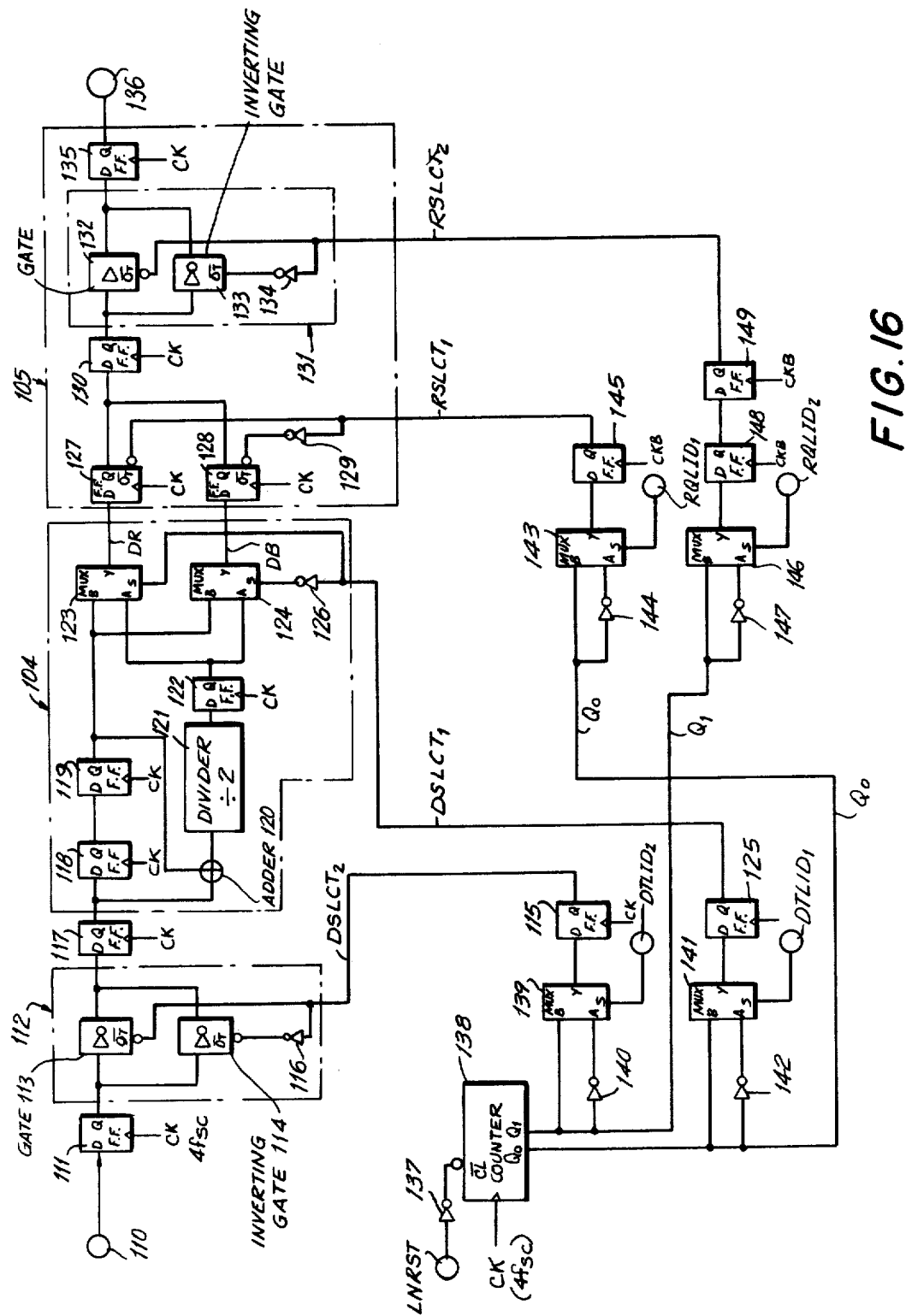
FIG. 16 is a more detailed block diagram of circuits included in the apparatus of FIG. 15.

Referring to FIG. 16 in detail, it will be seen that, in a particular arrangement of sample interpolating circuit 104 and color signal generating circuit 105 there illustrated, the separated chrominance component is suitably applied, in 8-bit parallel form, from filter 94 through an input terminal 110 to a D-type flip-flop 111 which receives a clock signal CK (FIG. 17A) of the frequency 4f$_{SC}$, and which acts as a latch for holding the chrominance data. The output Q of flip-flop 111 is applied to a circuit 112 which converts the color difference signals of the chrominance component to their absolute values. The circuit 112 is shown to include a gate 113 and an inverting gate 114 connected in parallel and being respectively controlled so that, if the received data is positive, such data passes without change of the polarity through gate 113, whereas, if the received data is negative, it passes through gate 114 and has its polarity inverted thereby. Each of gates 113 and 114 is opened when the value of its respective gating signal is low or "0". The gating signal for gate 113 is constituted by a data select signal DSLCT$_2$ (FIG. 17D) which is obtained at the output Q of a D-type flip-flop 115. Such data select signal DSLCT$_2$ is applied through an inverter 116 to form the gating signal for gate 114 which, as earlier noted, is opened when the output of inverter 116 is "0", that is, when the data select signal DSLCT$_2$ is "1". The D-type flip-flop 115 is controlled, as hereinafter described in detail, so that the value of the data select signal DSLCT$_2$ is "0" to open gate 113 whenever the red or blue color difference signal DR or DB, respectively, appearing at the output of flip-flop 111 is of positive polarity, for example, as indicated by a symbol Ⓡ or Ⓑ respectively, on FIG. 17F. Conversely, flip-flop 115 causes its output DSLCT$_2$ to have the value "1" for opening the inverting gate 114 whenever the color difference signal DR or DB appearing at the output of flip-flop 111 is of negative polarity, as indicated by a symbol R or B on FIG. 17F.

The resulting absolute value signal obtained from circuit 112 is held by a D-type flip-flop 117. Thus, if the sequence of color difference signals at the output of flip-flop 111 is +DR$_1$, +DB$_2$, −DR$_3$, −DB$_4$, +DR$_5$, +DB$_6$, −DR$_7$, -etc., as symbolically shown on FIG. 17F, then the content of flip-flop 117 will be the sequence of absolute values +DR$_1$, +DB$_2$, +DR$_3$, +DB$_4$, +DR$_5$, +DB$_6$, +DR$_7$, -etc., as symbolically represented on FIG. 17G.

The sample interpolating circuit 104 is shown on FIG. 16 to generally comprise D-type flip-flops 118 and 119 connected in sequence to the output of flip-flop 117 so that the content of flip-flop 119 (FIG. 17H) will be delayed by two samples in respect to the content of flip-flop 117 (FIG. 17G). Further, an adder 120 is provided in circuit 104 for adding together the content of flip-flop 117 and the content of flip-flop 119, and the output of adder 120 is divided by 2 in a divider 121. Thus, for example, if the content of flip-flop 117 is DR$_3$ and the content of flip-flop 119 is DR$_1$, then the output of divider 121 is DR$_1$+DR$_3$/2=R'$_2$ which is latched by a D-type flip-flop 122 (FIG. 17J). The sample interpolating circuit 104 is further shown to comprise multiplexers 123 and 124 having respective A inputs connected to the output of flip-flop 122 and respective B inputs connected to the output of flip-flop 119. The multiplexer 123 is controllable by a data select signal DSLCT$_1$ (FIG. 17E) obtained at the output Q of a D-type flip-flop 125, and such data select signal DSLCT$_1$ is applied through an inverter 126 for controlling the multiplexer 124. As hereinafter described in detail, the multiplexers 123 and 124 are controlled to provide the red color difference signals (FIG. 17K) and the blue color difference signals (FIG. 17M) at their respective outputs.

The DR signals and DB signals obtained at the outputs of multiplexers 123 and 124, respectively, and which include sample interpolated values are held by flip-flops 127 and 128, respectively, at the input side of color signal generating circuit 105. Flip-flops 127 and 128 are made to selectively deliver the signals held thereby (FIG. 17L and FIG. 17N, respectively) in accordance with a request select signal RSLCT$_1$ (FIG. 17P) which is applied directly to flip-flop 127 and through an inverter 129 to flip-flop 128. The outputs of flip-flops 127 and 128 are connected together to a flip-flop 130 so that the respective absolute values of the sample interpolated color difference signals will be held by flip-flop 30. The output (FIG. 17Q) of flip-flop 130 is applied to a circuit 131 which is operative to restore the requisite polarities to the color difference signals.

The circuit 131 is shown to include a gate 132 and an inverting gate 133 connected in parallel and each being opened when the value of its respective gating signal is low or "0". The gating signal for gate 132 is constituted by a request select signal RSLCT$_2$ (FIG. 17R), and such request select signal RSLCT$_2$ is also applied to an inverter 134 to provide the gating signal for gate 133. When gate 132 is opened, the color difference signal then being provided from flip-flop 130 passes through gate 132 without change of its polarity so as to have a positive polarity at the output of circuit 131, whereas, when gate 133 is opened, the color difference signal then appearing at the output of flip-flop 130 has its polarity inverted in passing through gate 133 so as to appear with a negative polarity at the output of circuit 131. The output of circuit 131 is applied to a flip-flop 135 acting as a latch and the resulting generated color signal (FIG. 17S) is applied from latch 135 to an output terminal 136 which may be connected to the adder 101 of FIG. 15.

The signals $DSLCT_1$ and $DSLCT_2$ which control the production of the interpolated values of the color difference signals are respectively determined by data line ID signals $DTLID_1$ and $DTLID_2$ which are respectively constituted by the first and second bits of the 2-bit codes [11], [00], [10] and [01] used to identify the four different kinds of lines of the PAL color video signal, as in the right hand portion of FIG. 14.

More particularly, as shown on FIG. 16, a line reset signal or pulse LNRST (FIG. 17B) occurring at the beginning of each line is applied through an inverter 137 to a clear terminal $\overline{CL}$ of a four-stage counter 138 so that the latter is reset or cleared at the beginning of each line in response to the falling edge of the line reset pulse LNRST. After being cleared or reset, counter 138 counts the clock pulse or signal CK (FIG. 17A) to provide a first stage or $2^0$ output $Q_0$ and a second stage or $2^1$ output $Q_1$. The output $Q_1$ of counter 138 is connected directly to a B input of a multiplexer 139 and, through an inverter 140, to an A input of multiplexer 139 which is controlled by the data line identifying signal $DTLID_2$, and which has its output applied to flip-flop 115 to be held in the latter. The first stage or $2^0$ output $Q_0$ of counter 138 is similarly connected directly to a B input of a multiplexer 141 and, through an inverter 142, to the A input of such multiplexer which is controlled by data line identifying signal $DTLID_1$, and which has its output connected to flip-flop 125 to be held in the latter. Each of multiplexers 139 and 141 is operative to select its respective input B when the control signal $DTLID_2$ or $DTLID_1$, respectively, is high or "1", and otherwise to select the respective input A when the control signal is low or "0".

By way of example, if the data being read out of memory 91 is of the first type of line indicated at the right hand portion of FIG. 14, that is, a line beginning with the color difference signals $+DR_1$, $+DB_2$, the respective line identifying code being simultaneously read out of memory 93 is [11] so that each of signals $DTLID_1$ and $DTLID_2$ is "1". In response to the foregoing, each of multiplexers 139 and 141 selects its B input so that the $Q_1$ and $Q_0$ outputs of counter 133 are passed through multiplexers 139 and 141 to be held by flip-flops 115 and 125, respectively, as indicated on FIGS. 17D and 17E, respectively. By reason of the foregoing, during the application of color difference signals $+DR_1$ and $+DB_2$ to circuit 112, signal $DSLCT_2$ is "0" (FIG. 17D) so that the data of color difference signals $+DR_1$ and $+DB_2$ are supplied to flip-flop 117 through gate 113 without change of the polarity. However, when the following color difference signals $-DR_3$ and $-DB_4$ of negative polarity are applied to circuit 112, the output $DCLCT_2$ of flip-flop 115 is "1" (FIG. 17D) with the result that such color difference signals pass through inverting gate 114 and are applied to flip-flop 117 with positive polarities. Accordingly, absolute values of the successive color difference signals appear at the output of flip-flop 117 (FIG. 17G).

Continuing with the above example, that is, the case in which the data being read out of memory 91 is from the type of line having the indentifying code [11], the output $Q_0$ of counter 138 held by flip-flop 125 to form the siganl $DSLCT_1$ (FIG. 17E) causes multiplexers 123 and 124 to alternately select the outputs of flip-flop 119 and flip-flop 122, respectively, so that the output of multiplexer 123 provides a red color difference signal (FIG. 17K) for every sampling point to be held by flip-flop 127 (FIG. 17L) and the output of multiplexer 124 similarly provides a blue color difference signal (FIG. 17M) for every sampling point to be held by flip-flop 128 (FIG. 17N).

It will be apparent that the sample interpolation of the color difference signals is controlled on the basis of the line identifying signals $DTLID_1$ and $DTLID_2$ derived from the sub-blocks being successively read out of memory 91. On the other hand, the operations of color signal generating circuit 105 are governed on the basis of request line identifying signals $RQLID_1$ and $RQLID_2$ which are similarly either "1" or "0" and constitute a 2-bit code signifying the type of line identified by the read request signal.

More particularly, in the embodiment of the invention illustrated by FIG. 16, the output $Q_0$ of counter 138 is applied directly to a B input of a multiplexer 143 and is further applied through an inverter 144 to an A input of multiplexer 143. The output of multiplexer 143 is applied to a D-type flip-flop 145 which, at its output, provides the request select signal $RSLCT_1$ (FIG. 17P) which controls the selective delivery of the red and blue color difference signals DR and DB from flip-flops 127 and 128, respectively. The request line identifying signal $RQLID_1$ controls multiplexer 143 so that the latter selects its B input when the signal $RQLID_1$ is "1" and otherwise selects the A input.

Further, as shown, the output $Q_1$ of counter 138 is applied directly to a B input of a multiplexer 146, and through an inverter 147 to an A input of multiplexer 146. The output of multiplexer 146 is applied through a D-type flip-flop 148 to a D-type flip-flop 149 which provides the request select signal $RSLCT_2$ at its output. It will be appreciated that flip-flop 148 acts to delay the transmission of the output of multiplexer 146 to flip-flop 149 by one sampling period. Once again, multiplexer 146 is controlled to select its B input only when the value of the respective request line identifying signal $RQLID_2$ is high or "1".

By way of example, if the request line identifying signals $RQLID_1$ and $RQLID_2$ are each low or "0" which means that the line of color difference signals to be delivered to output terminal 136 as the chrominance component is of the second type indicated in the right hand portion of FIG. 14, and should begin with $(-DB)$ and $(-DR)$, multiplexers 143 and 146 select their respective A inputs with the result that the request select signal $RSLCT_1$ is constituted by the inverted output $Q_0$ of counter 138 (FIG. 17P) and the request select signal $RSLCT_2$ is constituted by the inverted output $Q_1$ of counter 138 suitably delayed by one sampling period (FIG. 17R). Since flip-flop 127 is made to selectively deliver the red color difference signal held thereby in response to the low or "0" value of signal $RSLCT_1$, and flip-flop 128 is made to selectively deliver the blue color difference signal held thereby in response to the high or "1" value of signal $RSLCT_1$, the signal $RSLCT_1$ shown in FIG. 17P, causes the content of flip-flop 130 to be the sequence of sample interpolated color difference signals shown in FIG. 17Q. It should be noted that the asterisk appearing at the beginning of the sequence of color difference signals in FIG. 17Q, and also in each of FIGS. 17M and 17N, refers to the interpolated value $(B_0+B_2)/2$ which cannot be determined accurately. While such color difference signal represented by the asterisk is not accurately determined, that fact is not important as the signal in question appears at a side edge of the reproduced picture.

Since gates 132 and 133 are each selectively opened when the value of the respective gating signal is low or "0", in the example being described and in which signal $RSLCT_2$ has the value "1" (FIG. 17R) during the first two sampling periods of the line of color difference signals being transmitted from flip-flop 130, such value of $RSLCT_2$ is effective, through inverter 134, to open inverting gate 133, thereby imparting negative polarity to the sample interpolated values of the color difference signals for the first two sampling periods of the line, as indicated at * and $R'_2$ on FIG. 17S. During the next two sampling periods in which the signal $RSLCT_2$ is "0", gate 132 is open to transmit the absolute sample interpolated values $B'_3$ and $R'_4$ without change of polarity, so that such sample interpolated color difference signals are symbolically shown on FIG. 17S to have positive polarities at the output of flip-flop 135.

It will be appreciated from the above description of the embodiment of this invention illustrated on FIGS. 15 and 16 that, also in the case of the processing of a PAL color video signal, when the reproduced signal read out from memory 91 does not agree as to its line, field and/or frame, with the read request signal, for example, in the event of error concealment in the normal reproducing mode or during non-normal or high speed reproducing, the processing apparatus according to this invention is always effective to produce a digital color video signal which substantially corresponds with the read request signal and thus is capable of providing a reproduced color picture free of color distortions and discontinuities.

In accordance with the invention, even if the data read out from the memory 51 or 91 is information of a line which is shifted vertically on the picture from the requested line to be read out, at least the luminance data for such line requested to be read out is obtained by line interpolation. Moreover, a color signal which corresponds to the signal requested to be read is obtained merely by determining the polarity of the read-out color signal, in the case of an NTSC color video signal, and further by demodulating the color signal into color difference signals which are supplemented by sample interpolation so as to provide full color information for all sample points in the case of a PAL color video signal.

By reason of the foregoing, application of the invention to a digital VTR, as in the specifically described embodiments, makes it possible to obtain an excellent color television picture even during non-normal reproducing, for example, in the high-speed, still-picture or slow-motion modes.

It will be appreciated that, in the described embodiments of this invention, the address control of the memories 51 and 53, or of the memories 91 and 93, for the picture data and the identifying signals, respectively, is based on an address signal or code which is fixed or predetermined for the respective sub-block whether in the normal reproducing mode or in a non-normal reproducing mode, and, as a result thereof, the address control is unified and can be effected with a relatively simplified arrangement.

In the specifically described embodiments of the invention and examples of the operations thereof, the sampling frequency for digitization has been assumed to be $4f_{SC}$, that is, four times the color subcarrier frequency. However, it will be appreciated that the sampling frequency is not limited to that value, but may be, for example, three times the color subcarrier frequency. Moreover, although the color video signal undergoing the processing according to this invention has been described as being a composite signal, it will be understood that the interpolation effected according to this invention is similarly applicable in the case of component coding in which digitization is effected of a component color video signal, for example, composed of the components Y, I and Q, or Y, U and V. Furthermore, the present invention is not limited, in its application, to the reproduced color video signal in a digital VTR, but may be similarly applied to various other devices in which a color video signal or other digitized data is transmitted and it is desired to correct or conceal errors in the transmitted data.

In the embodiments of this invention illustrated on FIGS. 13 and 15, respectively, the digital color video signal read out from the memory 51 or 91 is only then separated into its luminance and chrominance components. However, it is to be understood that the invention may be similarly applied to arrangements in which such components of the digital color video signal are separated from each other prior to being written in respective individual memories which replace the single memory 51 or 91. Further, although each of the memories 51 or 91 is a so-called field memory in that it has a capacity sufficient to store the data for one field of the respective channel, it is possible, instead, to employ a frame memory, that is, a memory having a capacity sufficient to store the data of a full frame of the respective channel. In the latter case, it is not necessary to provide the so-called line interpolating which has been described for obtaining interpolated values of the luminance component when the read-out line is spatially displaced from the line identified by the read request signal.

Having described various specific embodiments of the present invention and a number of modifications thereof, it is to be understood that the invention is not limited to those precise embodiments and modifications, and that various changes and further modifications can be effected therein by one skilled in the art without departing from the scope or spirit of this invention as defined in the appended claims.

What is claimed is:

1. An apparatus for processing color video information composed of a color video signal having luminance and chrominance components and a respective identifying signal which identifies a phase of said chrominance component, said color video information being in the form of a digital signal divided into a succession of blocks each containing data of said color video signal and said respective identifying signal which identifies at least one of the frame, field and line of said data of the color video signal contained in the respective block, said apparatus comprising:
  memory means for temporarily storing said color video signal and said respective identifying signal,
  means for simultaneously reading out said color video signal and the respective identifying signal from said memory means, means for effecting a comparison of said identifying signal, as read out of said memory means, with a reference signal, means responsive to said comparison for controlling the phase of said chrominance component of the color video signal read out from said memory means, line interpolating means also responsive to said comparison for providing an interpolated value of at least said luminance component of a data block being read out of said memory means when said identifying signal being simultaneously read out identifies a field different from a field identified by said reference signal, said interpolated value being based on the value of the luminance component in the line of said data block being read out of said memory means and on the value of the luminance component in an adjacent line stored in said memory means, and interpolator control means for said interpolating means causing said adjacent line to be the line which precedes the line of the data block being read out when said different fields identified by said identifying signal and said reference signal, respectively, are of the same frame and causing said adjacent line to be the line which follows the line of the data block being read out when said different fields are from different frames, respectively.

2. Apparatus according to claim 1; in which each of said blocks further contains a respective address signal; and in which said memory means includes a first memory for storing said data of each block at an address therein dictated by the respective address signal, and a second memory for storing said identifying signal of each said block at an address therein which is also dictated by said respective address signal.

3. An apparatus according to claim 2; wherein said digital signal has been converted from an analog color video signal composed of successive frames each having a plurality of fields each constituted by successively numbered lines which are interlaced in a pictorial representation of the complete frame; and further comprising memory control means for said first and second memories causing the writing of each error-free data block and the respective identifying signal at said dictated addresses in the first and second memories, respectively, where there were earlier written a data block and the respective identifying signal of the same numbered line of a previous field, and means for inhibiting the writing in said first and second memories of each data block containing an error and of the respective identifying signal, respectively.

4. An apparatus according to claim 3; in which said first memory and said second memory each have a capacity substantially equivalent to one field of said video signal.

5. An apparatus according to claim 4; in which said color video signal is a PAL signal and said chrominance component is composed of color difference signals which only appear at predetermined respective sampling points along each line; and further comprising sample interpolating means operative, when an identifying signal being read out of said second memory identifies a line different from a line identified by said reference signal, to provide interpolated values of each of said color difference signals for the sampling points along the line of the data block simultaneously read out of said first memory at which values of said color difference signal are absent, each said interpolated value of a color difference signal being based on values of the respective color difference signal at sampling points adjacent the sampling point from which said respective color difference signal is absent.

6. An apparatus according to claim 5; in which said sample interpolating means includes means to obtain absolute values of each of said color difference signals, and means for interspersing said absolute values between said interpolated values based on said absolute values in an order determined by the line identified by said reference signal; and in which said means for controlling the phase of said chrominance component acts on the interspersed values to provide the same with polarities corresponding to the line of said PAL signal identified by said reference signal.

7. An apparatus according to claim 1; in which said color video information is a signal reproduced from a magnetic tape in a tape reproducing apparatus.

8. An apparatus according to claim 1; in which memory means includes a single memory for storing said luminance and chrominance components as a composite signal.

9. An apparatus according to claim 1; in which said color video signal is a PAL signal and said chrominance component is composed of color difference signals which only appear at predetermined respective sampling points along each line; and further comprising sample interpolating means operative, when an identifying signal being read out of said memory means identifies a line different from a line identified by said reference signal, to provide interpolated values of each of said color difference signals for the sampling points along the line being simultaneously read out of said memory means at which values of said color difference signal are absent, each said interpolated value of a color difference signal being based on values of the respective color difference signal at sampling points adjacent the sampling point from which said respective color difference signal is absent.

10. An apparatus according to claim 9; in which said sample interpolating means includes means to obtain absolute values of each of said color difference signals, and means for interspersing said absolute values between said interpolated values based on said absolute values in an order determined by the line identified by said reference signal; and in which said means for controlling the phase of said chrominance component acts on the interspersed values to provide the same with polarities corresponding to the line of said PAL signal identified by said reference signal.

11. An apparatus according to claim 1; in which said interpolating means gives equal weights in said interpolated value to said values of the luminance components in said line of the data block being read out and in said adjacent line when the respective lines are of the same field, and said interpolating means gives unequal weights to said luminance components in said interpolated value when the respective lines are of different fields.

12. A method for processing color video information composed of a color video signal having luminance and chrominance components and a respective identifying signal which identifies a phase of said chrominance component, said color video information being in the form of a digital signal divided into a succession of blocks each containing data of said color video signal and said respective identifying signal which identifies at least one of the frame, field and line of said data of the color video signal contained in the respective block, said method comprising:

writing said color video signal and said respective identifying signal in a memory, simultaneously reading out said color video signal and the respective identifying signal from the memory, comparing said identifying signal, as read out of the memory, with a reference signal, controlling the phase of said chrominance component of the color video signal read out from the memory in accordance with the comparison of the identifying and reference signals, interpolating a value of at least said luminance component of a data block being read out of said memory when said identifying signal being simultaneously read out of said memory identifies a field different from a field identified by said reference signal, said interpolated value being based on the value of the luminance component in the one of said data block being read out of the memory and on the value of the luminous component in an adjacent line stored in said memory, and controlling the interpolating so that said adjacent line is the line which precedes the line of the data block being read out when the different fields identified by said identifying and reference signals, respectively, are of the same frame, and said adjacent line is the line which follows the line of the data block being read out when said different fields are from different frames, respectively.

13. The method according to claim 12; in which each of said blocks further contains a respective address signal; and in which said data of each block is written in a first memory at an address therein dictated by the respective address signal, and said identifying signal of each said block is written in a second memory at an address therein which is also dictated by said respective address signal.

14. The method according to claim 13; wherein said digital signal has been converted from an analog color video signal composed of successive frames each having a plurality of fields each constituted by successively numbered lines which are interlaced in a pictorial representation of the complete frame; and further comprising controlling said first and second memories for causing the writing of each error-free data block and the respective identifying signal at said dictated addresses in the first and second memories, respectively, where there was earlier written a data block and the respective identifying signal of the same numbered line of a previous field, and inhibiting the writing in said first and second memories of each data block containing an error and of the respective identifying signal, respectively.

15. The method according to claim 14; in which said first memory and said second memory each have a capacity substantially equivalent to one field of said video signal.

16. The method according to claim 15; in which said color video signal is a PAL signal and said chrominance component is composed of color difference signals which only appear at predetermined respective sampling points along each line; and further in which, when an identifying signal being read out of said second memory identifies a line different from a line identified by said reference signal, values are interpolated for each of said color difference signals at the sampling points along the line of the data block simultaneously read out of said first memory at which values of said color difference signal are absent, each said interpolated value of a color difference signal being based on values of the respective color difference signal at sampling points adjacent the sampling point from which said respective color difference signal is absent.

17. The method according to claim 16; in which said sample interpolating is effected by obtaining absolute values of each of said color difference signals, and interspersing said absolute values between said interpolated values based on said absolute values in an order consistent with the line identified by said reference signal; and in which said controlling of the phase of said chrominance component involves selecting the polarity of the inerspersed values to make the same correspond to the line of said PAL signal identified by said reference signal.

18. The method according to claim 12; in which said color video information is a signal reproduced from a magnetic tape in a tape reproducing apparatus.

19. The method according to claim 12; in which said luminance and chrominance components are written as a composite signal in a common memory.

20. The method according to claim 12; in which said color video signal is a PAL signal and said chrominance component is composed of color difference signals which only appear at predetermined respective sampling points along each line; and further in which, when an identifying signal being read out of said memory identifies a line different from a line identified by said reference signal, values of each of said color difference signals are interpolated for the sampling points along the line being simultaneously read out of said memory at which values of said color difference signal are absent, each said interpolated value of a color difference signal being based on values of the respective color difference signal at sampling points adjacent the sampling point from which said respective color difference signal is absent.

21. The method according to claim 20; in which said sample interpolating includes obtaining absolute values of each of said color difference signals, and interspersing said absolute values between said interpolated values based on said absolute values in an order consistent with the line identified by said said reference signal; and in which said controlling of the phase of said chrominance component determines the polarities of the interspersed values to provide the same with polarities corresponding to the line of said PAL signal identified by said reference signal.

22. The method according to claim 12; in which equal weights are given in said interpolated value to said values of the luminance components in the line of the data block being read out and in said adjacent line when the respective lines are of the same field, and different weights are given to said luminance components in said interpolated value when the respective lines are of different fields.

* * * * *